United States Patent
Horita et al.

(10) Patent No.: US 10,166,981 B2
(45) Date of Patent: Jan. 1, 2019

(54) TRAVELING CONTROL DEVICE, ON-VEHICLE DISPLAY DEVICE, AND TRAVELING CONTROL SYSTEM

(71) Applicant: HITACHI AUTOMOTIVE SYSTEMS, LTD., Ibaraki (JP)

(72) Inventors: Yuki Horita, Tokyo (JP); Taisetsu Tanimichi, Hitachinaka (JP); Tatsuaki Osafune, Tokyo (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 24 days.

(21) Appl. No.: 15/300,544

(22) PCT Filed: Mar. 27, 2015

(86) PCT No.: PCT/JP2015/059567
§ 371 (c)(1),
(2) Date: Sep. 29, 2016

(87) PCT Pub. No.: WO2015/156146
PCT Pub. Date: Oct. 15, 2015

(65) Prior Publication Data
US 2017/0113686 A1 Apr. 27, 2017

(30) Foreign Application Priority Data
Apr. 9, 2014 (JP) ................................. 2014-079953

(51) Int. Cl.
*G05D 1/02* (2006.01)
*G08G 1/16* (2006.01)
(Continued)

(52) U.S. Cl.
CPC ............ *B60W 30/09* (2013.01); *B60W 10/04* (2013.01); *B60W 10/18* (2013.01); *B60W 10/20* (2013.01);
(Continued)

(58) Field of Classification Search
None
See application file for complete search history.

(56) References Cited

U.S. PATENT DOCUMENTS 9,229,453 B1 * 1/2016 Lee ...................... G05D 1/0214
9,708,000 B2 * 7/2017 Hafner ................... B62D 13/06
(Continued)

FOREIGN PATENT DOCUMENTS

DE 102009019702 A1 11/2009
JP 2005-199875 A 7/2005
(Continued)

OTHER PUBLICATIONS

English translation of Japanese Patent Appl. Pub. No. JP,2008-097501,A to Saito et al.*
(Continued)

*Primary Examiner* — Jean Paul Cass
(74) *Attorney, Agent, or Firm* — Volpe and Koenig, P.C.

(57) ABSTRACT

A traveling control system capable of reducing uneasiness felt by an occupant in automatic traveling control of a vehicle includes an on-vehicle control device which performs traveling control on the vehicle, and a display device that is connected to the on-vehicle control device and presents information to an occupant through screen display or audio output. The on-vehicle control device acquires externality recognition information recognized by an externality sensor and/or out-of-vehicle communication, decides driving behavior content to be taken by the vehicle based on the externality recognition information, specifies a driving behavior cause which is a reason why the driving behavior content is decided, and outputs the driving behavior content and the specified driving behavior cause. The display device acquires the driving behavior content and cause output by the control device and sends a notification of the driving
(Continued)

behavior content and cause through screen display or audio output.

9 Claims, 18 Drawing Sheets

(51) Int. Cl.
| | |
|---|---|
| *B60W 10/04* | (2006.01) |
| *B60W 10/18* | (2012.01) |
| *B60W 10/20* | (2006.01) |
| *B60W 30/00* | (2006.01) |
| *B60W 30/09* | (2012.01) |
| *B60W 30/18* | (2012.01) |
| *B60W 40/04* | (2006.01) |
| *B60W 40/06* | (2012.01) |
| *B60W 50/14* | (2012.01) |
| *B60W 30/095* | (2012.01) |

(52) U.S. Cl.
CPC ........ *B60W 30/00* (2013.01); *B60W 30/0956* (2013.01); *B60W 30/18163* (2013.01); *B60W 40/04* (2013.01); *B60W 40/06* (2013.01); *B60W 50/14* (2013.01); *G05D 1/0219* (2013.01); *G05D 1/0238* (2013.01); *G08G 1/16* (2013.01); B60W 2050/143 (2013.01); B60W 2050/146 (2013.01); B60W 2420/52 (2013.01); B60W 2520/06 (2013.01); B60W 2520/10 (2013.01); B60W 2550/10 (2013.01); B60W 2710/18 (2013.01); B60W 2710/20 (2013.01); G05D 2201/0213 (2013.01)

(56) References Cited

U.S. PATENT DOCUMENTS

| | | | | |
|---|---|---|---|---|
| 9,751,558 B2* | 9/2017 | Lavoie | .................... | B62D 6/10 |
| 9,755,941 B2* | 9/2017 | Ameixieira | ........... | H04L 5/0037 |
| 9,783,230 B2* | 10/2017 | Hafner | .................... | B62D 13/06 |
| 9,809,219 B2* | 11/2017 | Agnew | .................. | B60W 30/09 |
| 9,821,801 B2* | 11/2017 | Di Cairano | ........... | B60W 30/09 |
| 9,829,883 B1* | 11/2017 | Lavoie | ................. | G05D 1/0016 |
| 9,834,224 B2* | 12/2017 | Gordon | ............... | B60W 50/082 |
| 9,840,240 B2* | 12/2017 | Trombley | ............. | B60T 8/1708 |
| 2007/0159313 A1 | 7/2007 | Tamura | | |
| 2008/0189040 A1 | 8/2008 | Nasu et al. | | |
| 2009/0299552 A1* | 12/2009 | Villaume | .................. | G08G 1/22 |
| | | | | 701/3 |
| 2013/0030606 A1* | 1/2013 | Mudalige | ................. | G08G 1/22 |
| | | | | 701/2 |
| 2013/0190944 A1* | 7/2013 | Brandin | ................. | G01C 21/26 |
| | | | | 701/1 |
| 2015/0182160 A1* | 7/2015 | Kim | ...................... | A61B 5/0488 |
| | | | | 600/301 |
| 2017/0011210 A1* | 1/2017 | Cheong | ................. | H04W 12/06 |
| 2017/0011465 A1* | 1/2017 | Anastassov | ............. | G06Q 40/08 |
| 2017/0311534 A1* | 11/2017 | Rusciolelli | ........... | A01B 79/005 |
| 2017/0316692 A1* | 11/2017 | Rusciolelli | ............. | G08G 1/164 |
| 2017/0337813 A1* | 11/2017 | Taylor | .................. | G08G 1/0141 |
| 2017/0351261 A1* | 12/2017 | Levinson | ................ | G01S 17/42 |

FOREIGN PATENT DOCUMENTS

| | | |
|---|---|---|
| JP | 2008-097501 A | 4/2008 |
| JP | 2008-191781 A | 8/2008 |
| JP | 2010-198311 A | 9/2010 |

OTHER PUBLICATIONS

English translation of Japanese Patent Application Pub. No. JP,2005-199875,A to Tamura.*

English translation of Japanese Patent Application Pub. No. JP,2010-198311,A to Takano et al.*

Extended European Search Report dated Apr. 30, 2018 for the European Patent Application No. 15776048.9.

Japanese Office Action dated Jul. 3, 2018 for the Japanese Patent Application No. 2014-079953.

* cited by examiner

[Fig. 1]
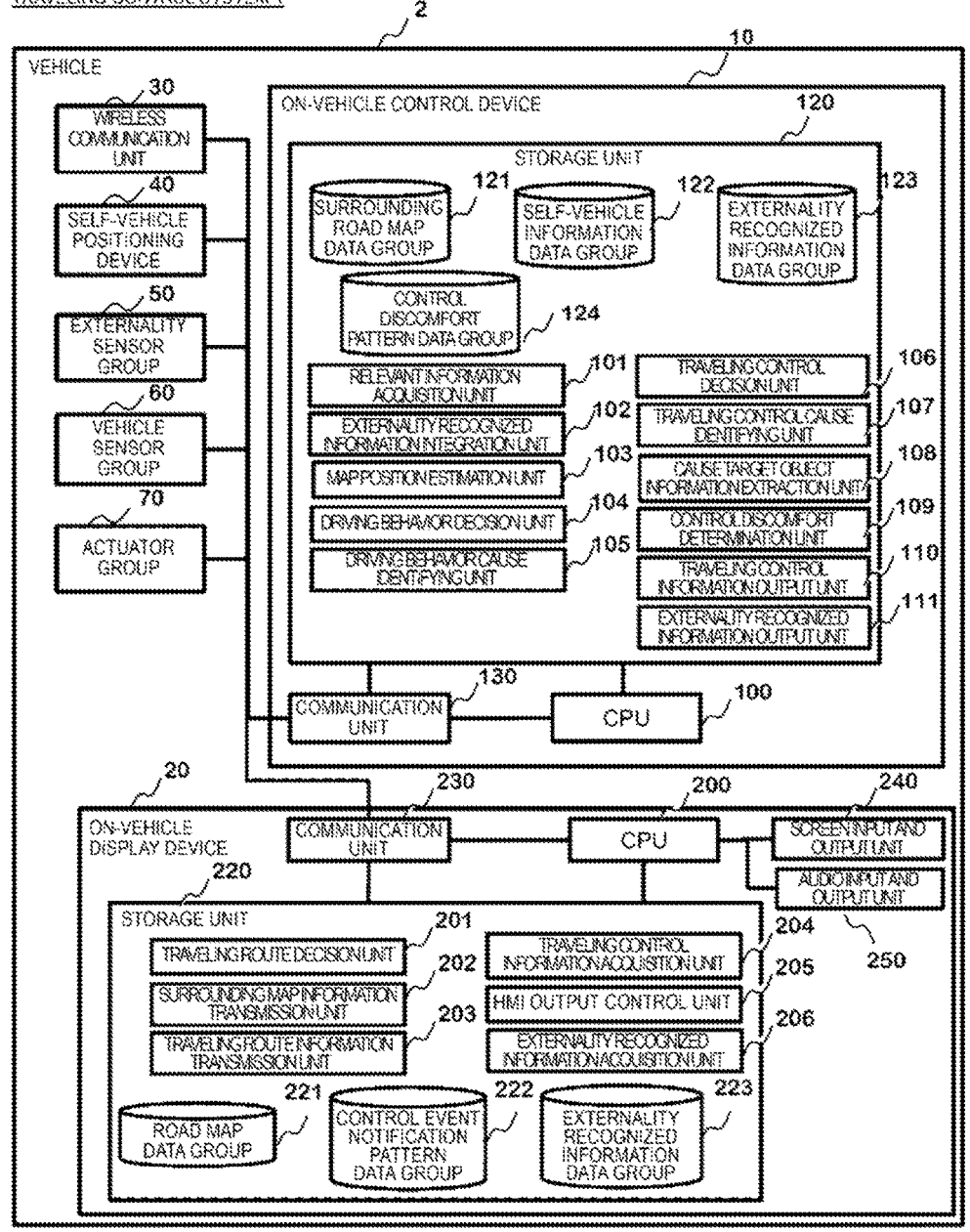

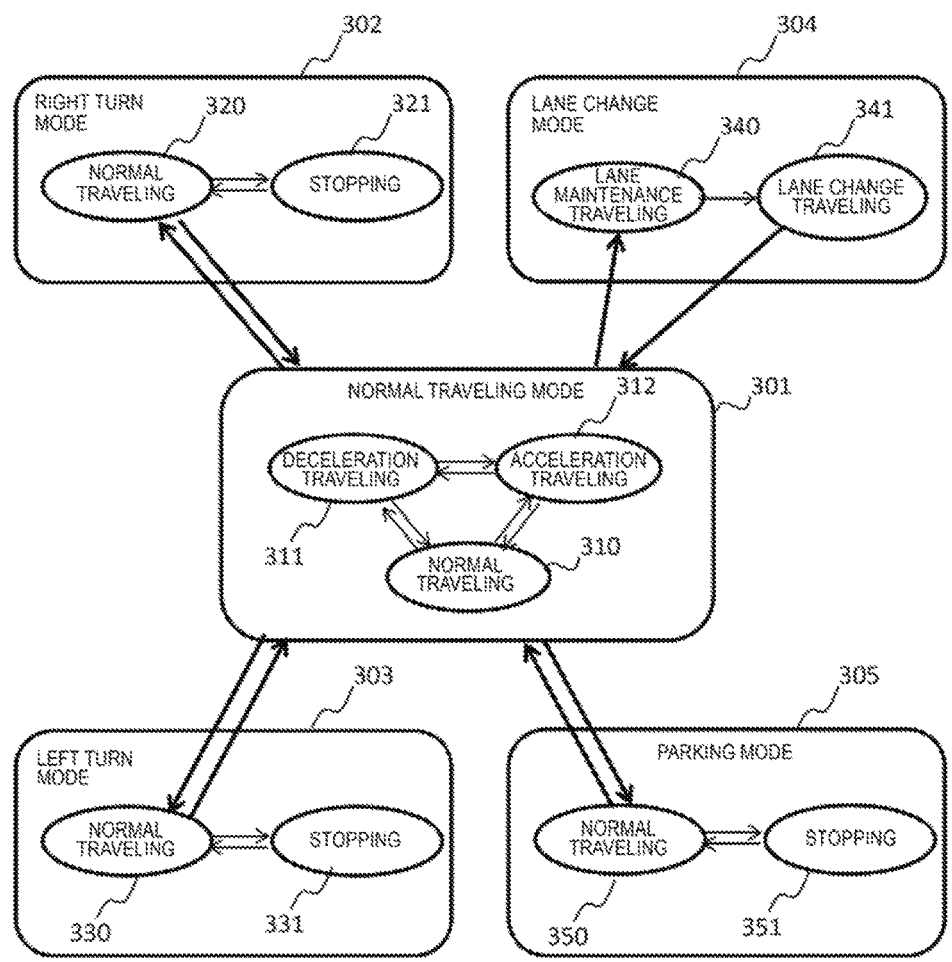

[Fig. 3]

CONTROL DISCOMFORT PATTERN DATA GROUP
124

| # | TYPE OF DRIVING BEHAVIOR (401) | TYPE OF TRAVELING CONTROL (402) | CAUSE (403) | DISTINCTIVE CONDITION (404) | DISCOMFORT LEVEL (405) |
|---|---|---|---|---|---|
| 1 | LEFT TURN | Any | SET ROUTE | - | 3 |
| 2 | RIGHT TURN | Any | SET ROUTE | - | 3 |
| 3 | PARKING | Any | SET ROUTE | - | 3 |
| 4 | PARKING | Any | USER DESIGNATION | - | 2 |
| 5 | LANE CHANGE | Any | STOPPED VEHICLE | - | 3 |
| 6 | LANE CHANGE | Any | LOW-SPEED VEHICLE | - | 3 |
| 7 | NORMAL TRAVELING | DECELERATION | PRECEDING VEHICLE | - | 1 |
| 8 | NORMAL TRAVELING | DECELERATION | CURVE | - | 1 |
| 9 | NORMAL TRAVELING | DECELERATION | SIGNAL | SIGNAL STATE ≠ RED | 3 |
| 10 | NORMAL TRAVELING | DECELERATION | SPEED LIMIT | - | 2 |
| 11 | NORMAL TRAVELING | DECELERATION | CONGESTION | - | 3 |
| 12 | LANE CHANGE | LANE CHANGE | Any | - | 2 |
| 13 | LEFT TURN | STOPPING | PRECEDING VEHICLE | - | 0 |
| 14 | LEFT TURN | STOPPING | PEDESTRIAN | - | 2 |
| ... | ... | ... | ... | ... | ... |

[Fig. 4]

CONTROL EVENT NOTIFICATION PATTERN DATA GROUP 222

| # | TYPE OF DRIVING BEHAVIOR | TYPE OF TRAVELING CONTROL | CAUSE | AUDIO NOTIFICATION SETTING | NUMBER OF NOTIFICATIONS |
|---|---|---|---|---|---|
| 1 | LEFT TURN | Any | SET ROUTE | NOTIFICATION | - |
| 2 | RIGHT TURN | Any | SET ROUTE | NOTIFICATION | - |
| 3 | PARKING | Any | SET ROUTE | NOTIFICATION | - |
| 4 | LANE CHANGE | Any | STOPPED VEHICLE | NON-NOTIFICATION | - |
| 5 | LANE CHANGE | Any | LOW-SPEED VEHICLE | NON-DESIGNATION | 10 |
| 6 | NORMAL TRAVELING | DECELERATION | SIGNAL | NOTIFICATION | - |
| 7 | NORMAL TRAVELING | DECELERATION | CONGESTION | NON-DESIGNATION | 8 |
| ... | ... | ... | ... | ... | |

411, 412, 413, 414, 415

[Fig. 5]
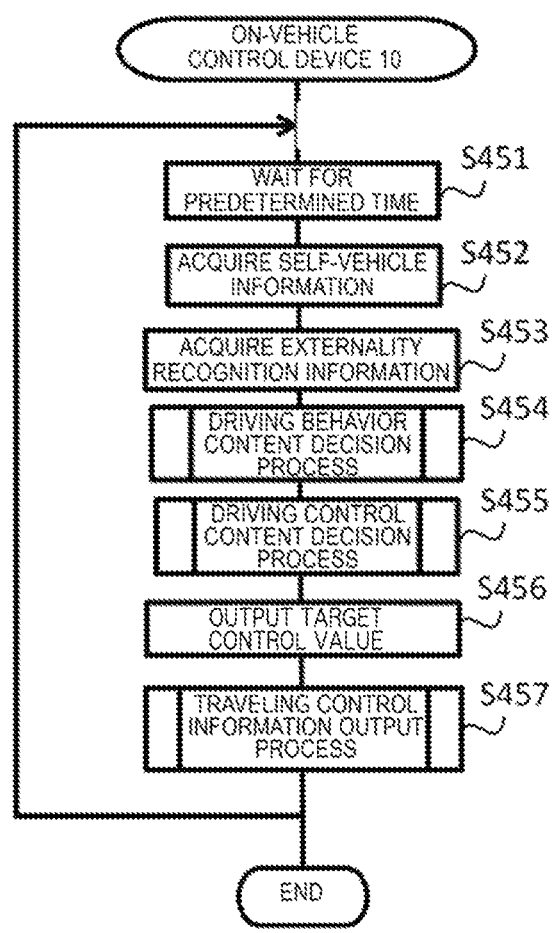

[Fig. 6]
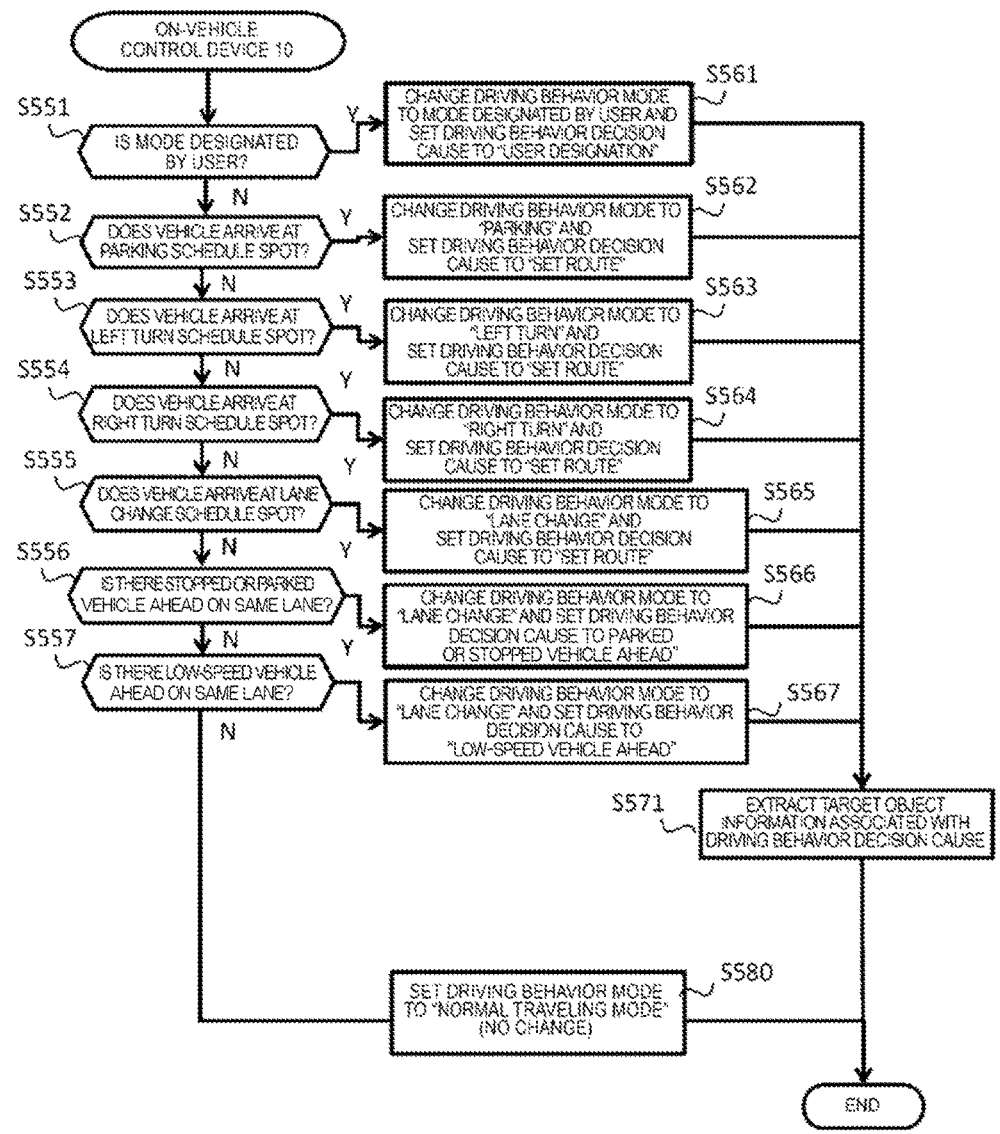

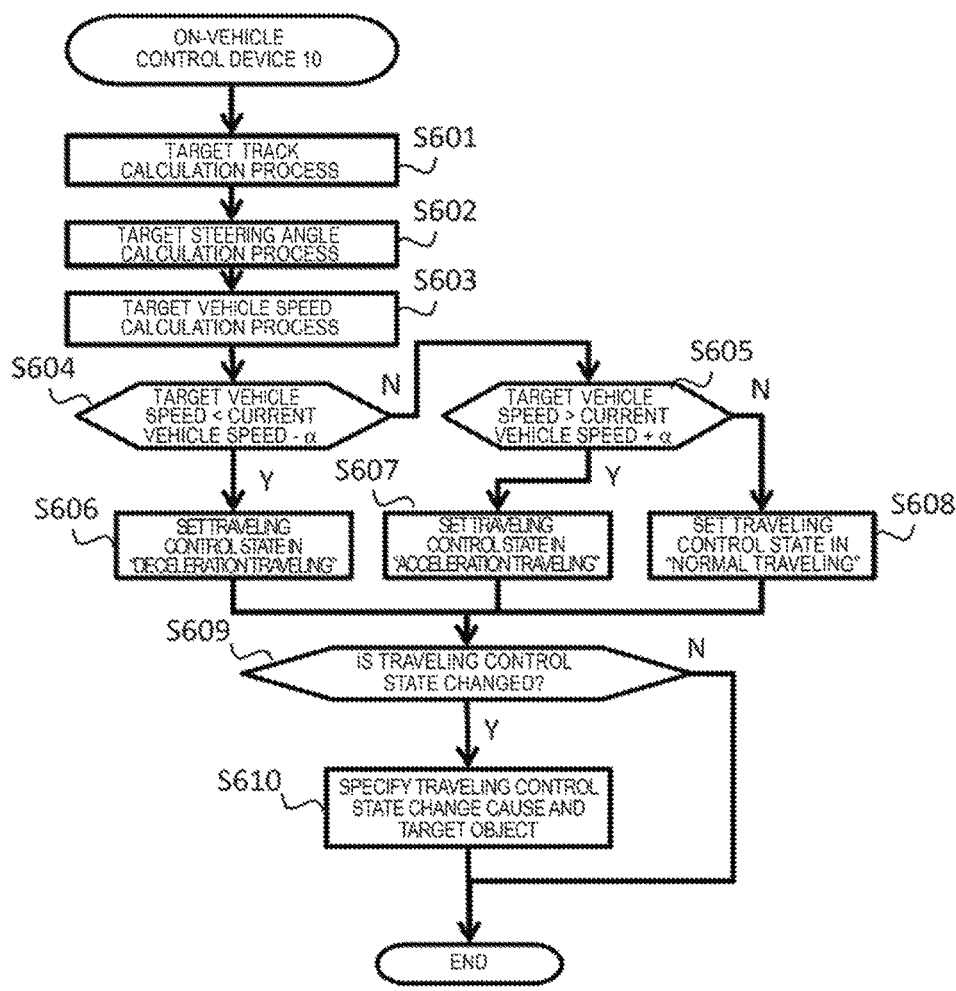
[Fig. 7]

[Fig. 8]
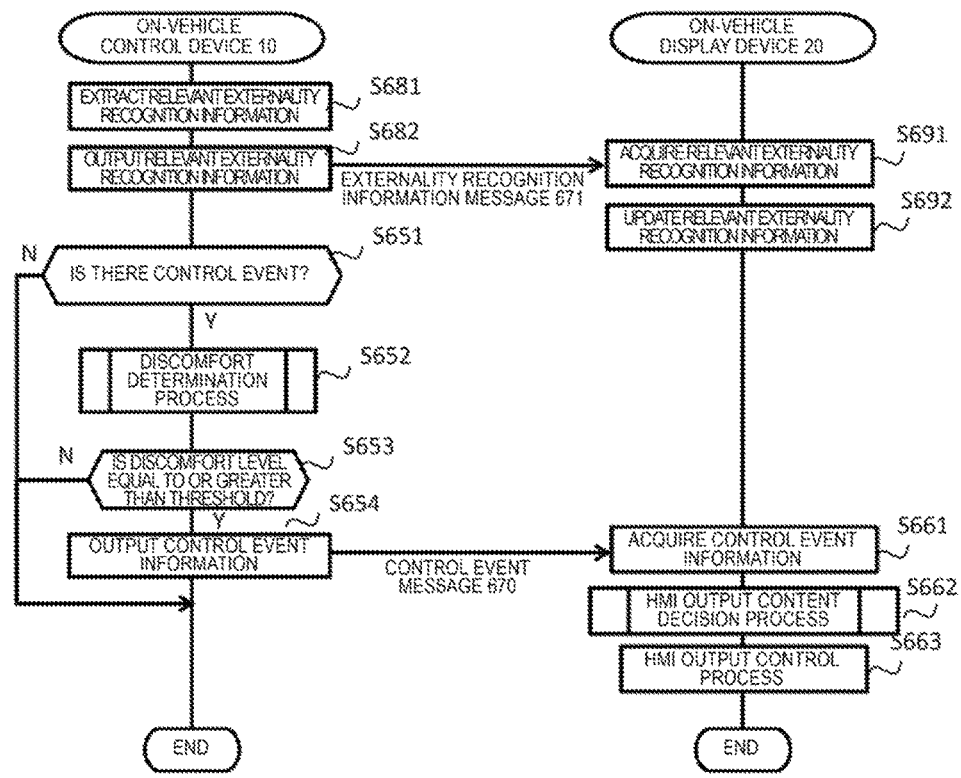

[Fig. 9]
FORMAT OF EXTERNALITY RECOGNITION INFORMATION MESSAGE 720
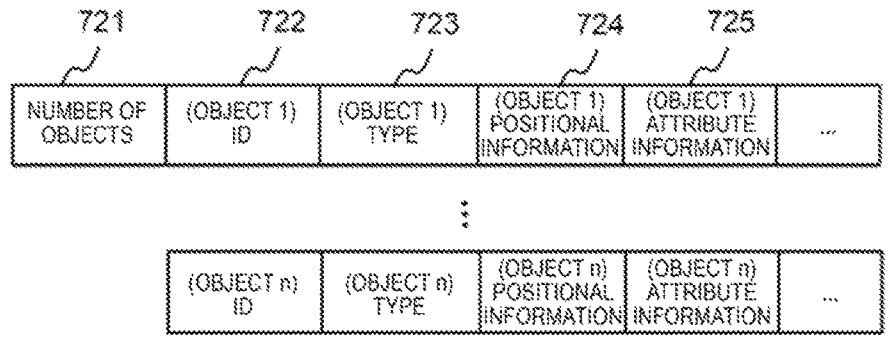
[Fig. 10]
FLOW OF DISCOMFORT DETERMINATION PROCESS 700
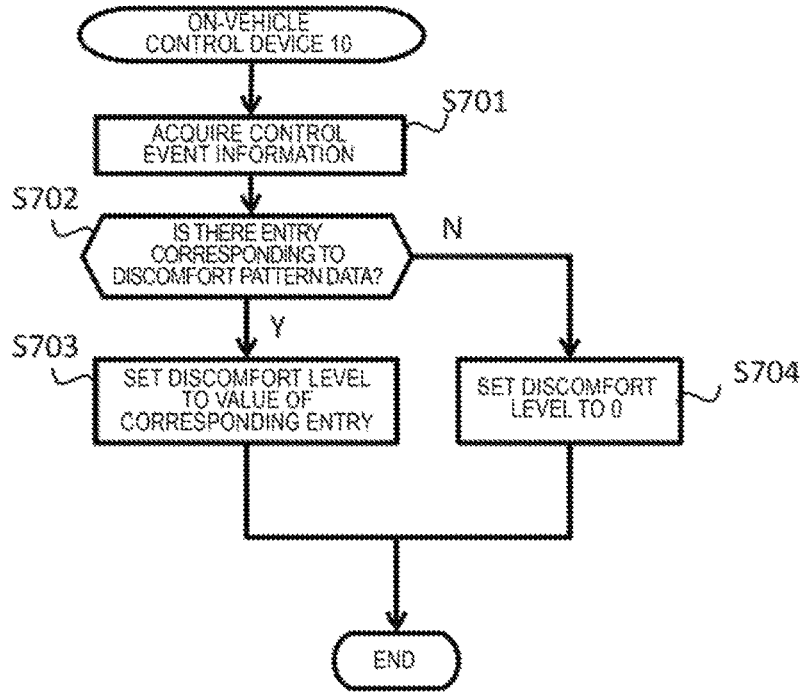

[Fig. 11]
FORMAT OF CONTROL EVENT MESSAGE 750
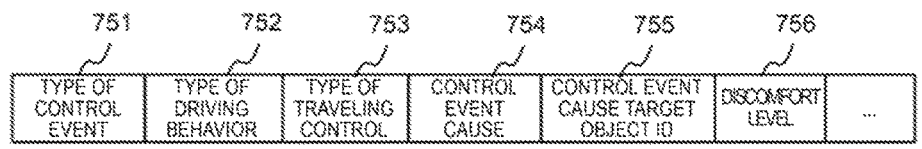
[Fig. 12]
FLOW OF HMI OUTPUT CONTENT DECISION PROCESS 800
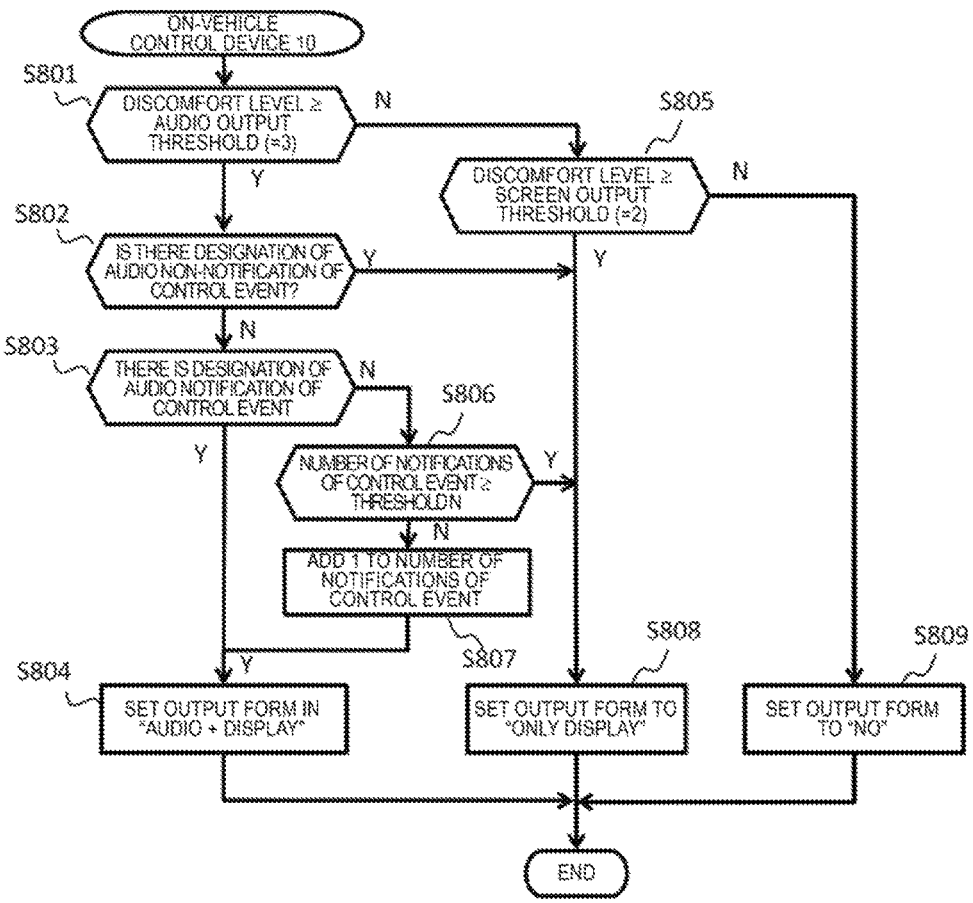

[Fig. 13]
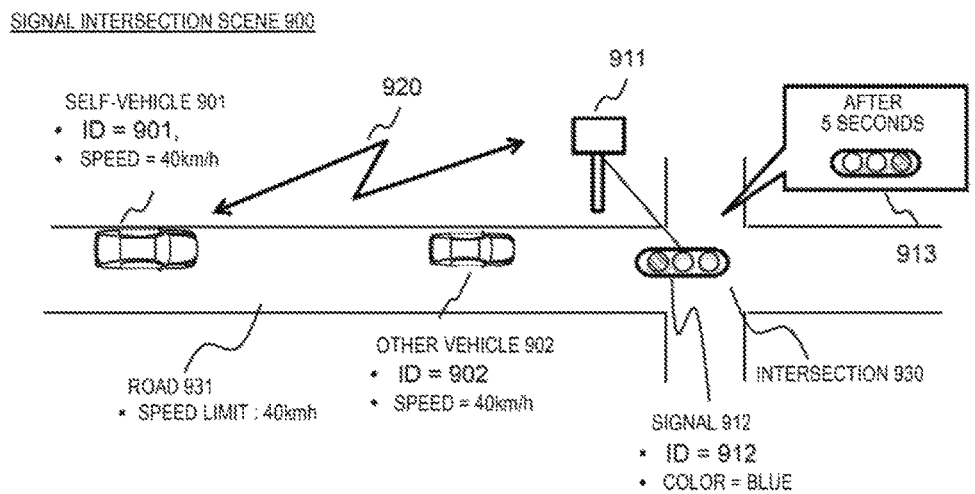

[Fig. 14]
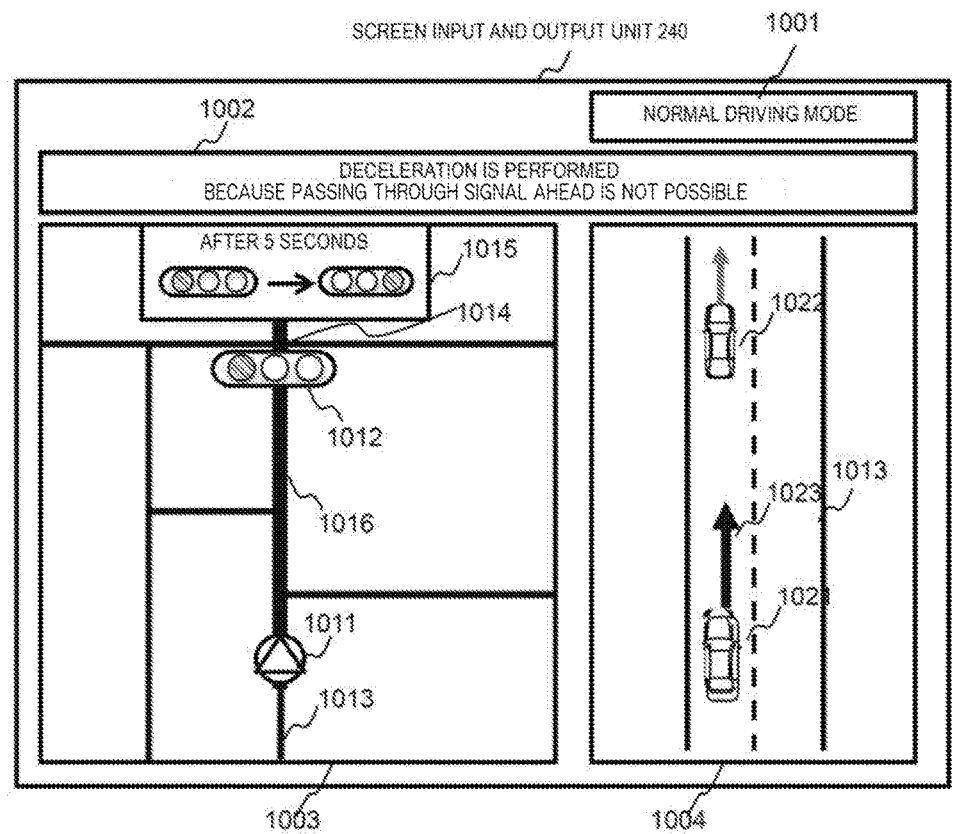

[Fig. 15]
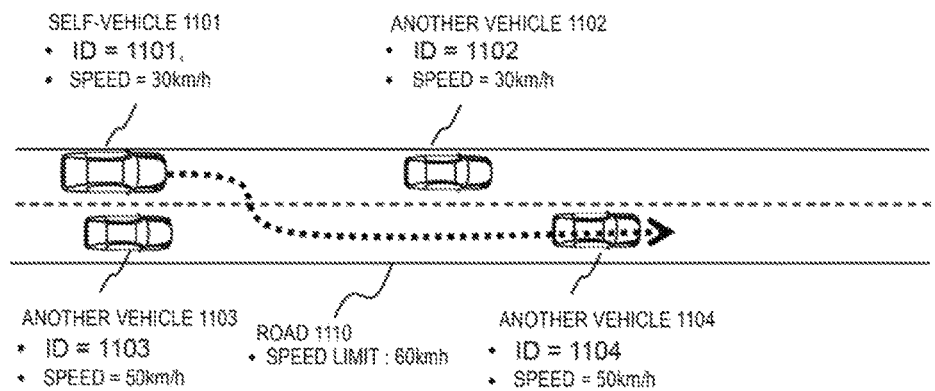

[Fig. 16]
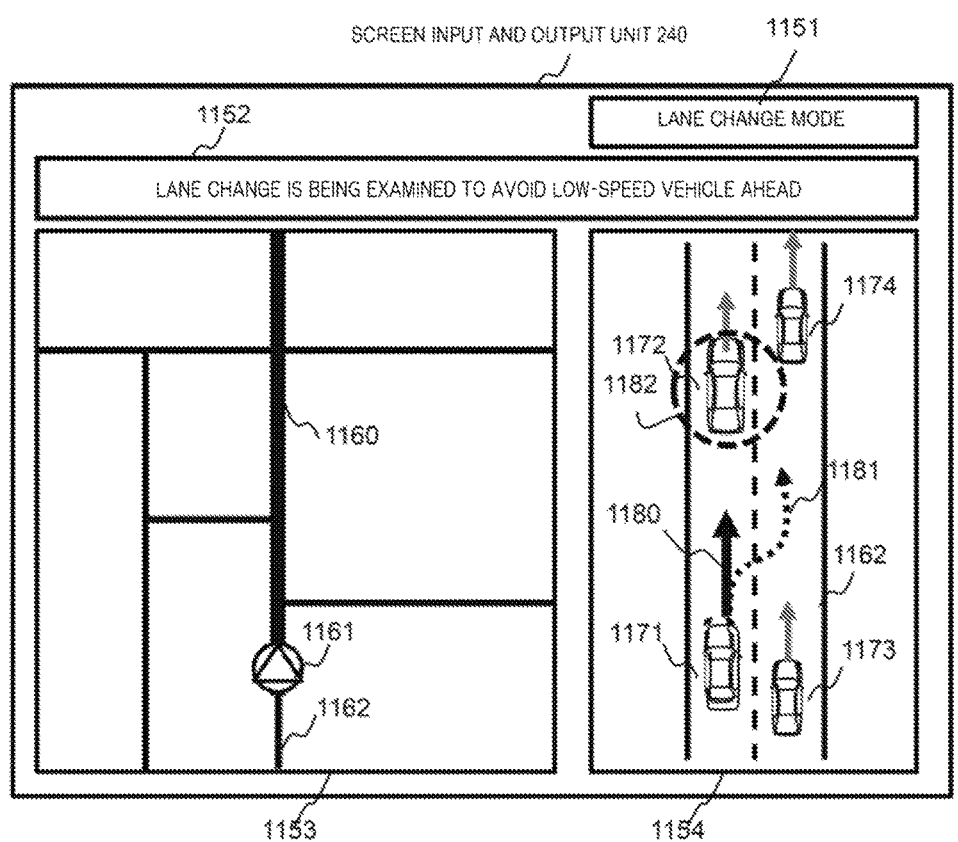

[Fig. 17]
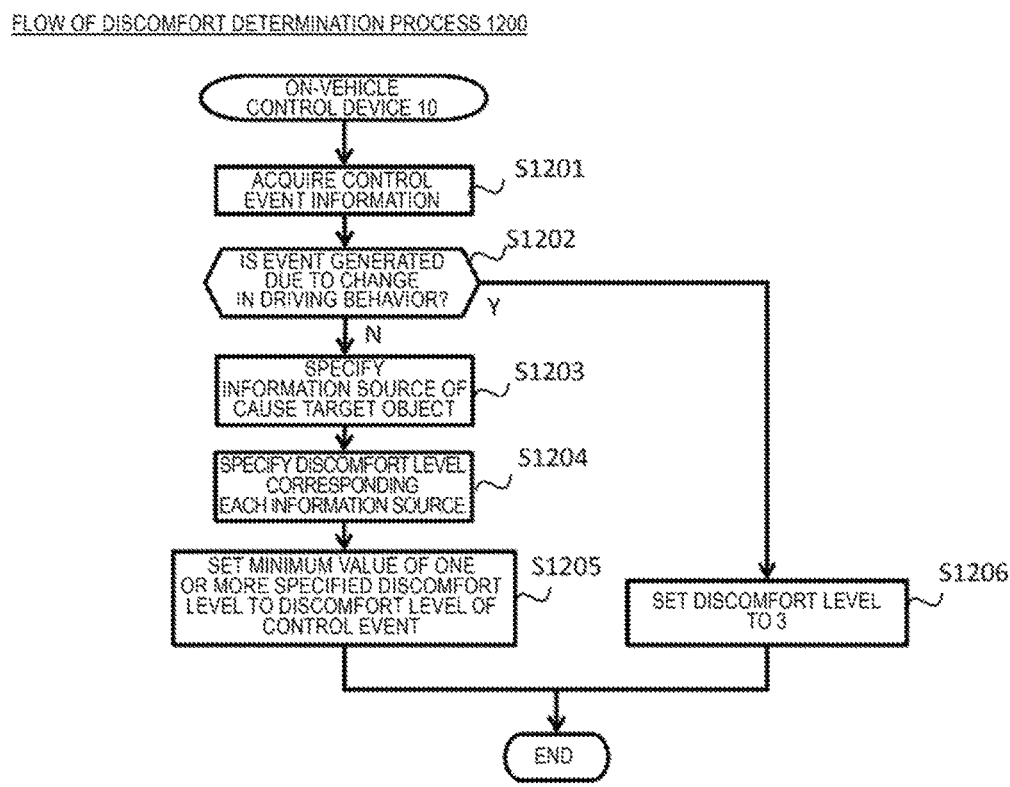

[Fig. 18]

CONTROL DISCOMFORT PATTERN DATA GROUP 1300

| # | TYPE OF INFORMATION SOURCE | DISTINCTIVE CONDITION | DISCOMFORT LEVEL |
|---|---|---|---|
| 1 | VISIBLE LIGHT CAMERA | Any | 0 |
| 2 | MILLIMETER WAVE RADAR | 150m <= RELATIVE DISTANCE | 3 |
| 3 | MILLIMETER WAVE RADAR | 80m <= RELATIVE DISTANCE < 150m | 2 |
| 4 | MILLIMETER WAVE RADAR | RELATIVE DISTANCE < 80m | 0 |
| 5 | LASER RADAR | Any | 0 |
| 6 | INFRARED CAMERA | NIGHT | 2 |
| 7 | INFRARED CAMERA | OTHER THAN NIGHT | 1 |
| 8 | WIRELESS COMMUNICATION | Any | 3 |
| ... | ... | ... | ... |

Columns: 1301, 1302, 1303

[Fig. 19]
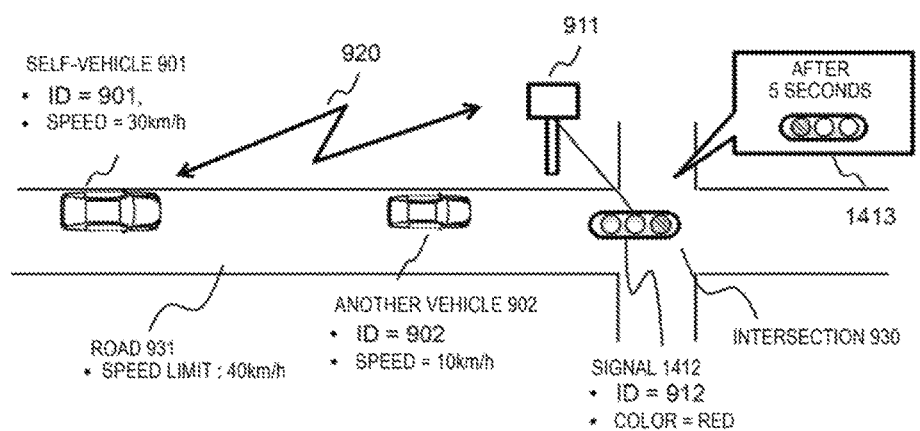

[Fig. 20]
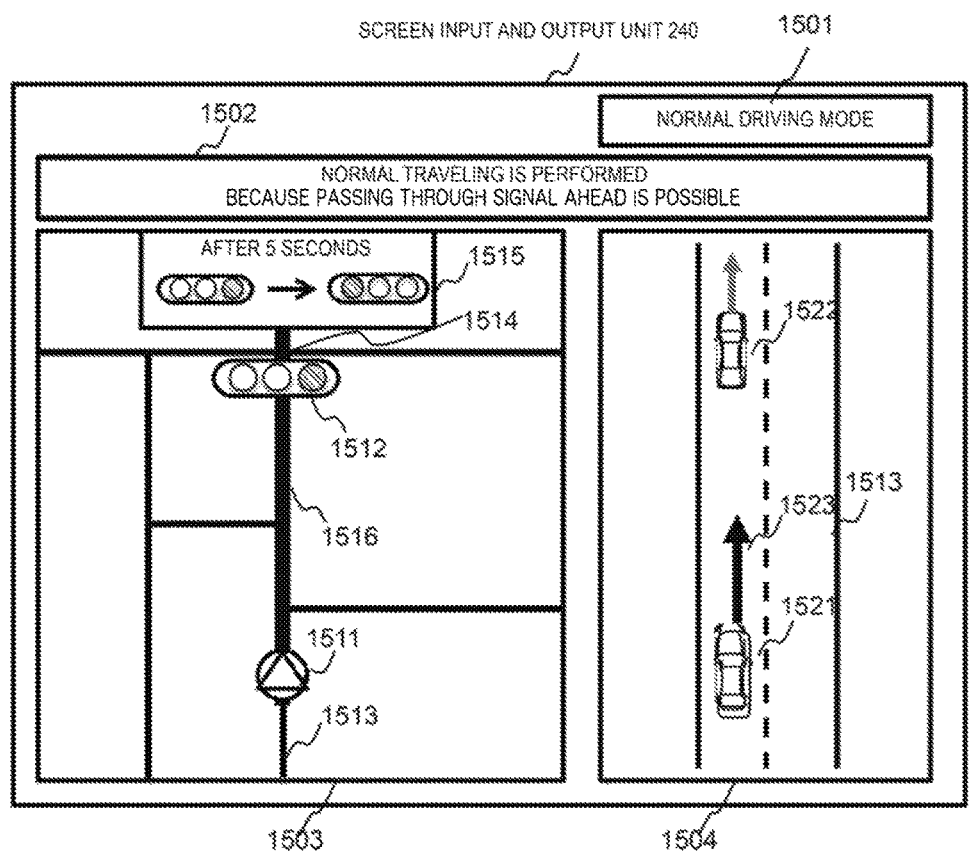

TRAVELING CONTROL DEVICE, ON-VEHICLE DISPLAY DEVICE, AND TRAVELING CONTROL SYSTEM

INCORPORATION BY REFERENCE

Priority is claimed on Japanese Patent Application No. 2014-79953, filed Apr. 9, 2014, the content of which is incorporated herein by reference.

TECHNICAL FIELD

The present invention relates to a traveling control device, an on-vehicle display device, and a traveling control system.

BACKGROUND ART

There are known systems that recognize surrounding situations of vehicles using on-vehicle externality sensors such as radars or cameras and automatically control traveling of the vehicles. In such systems, there is a problem that drivers or occupants may not immediately comprehend control purposes and may feel discomfort at the time of control. In automatic driving control in which systems take the initiative in driving, there is a problem that drivers or occupants may not comprehend a series of traveling control intended by vehicles and feel discomfort.

PTL 1 discloses a technology for displaying situations of surrounding obstacles of a vehicle or a target trace of the vehicle on an on-vehicle display device. According to the technology disclosed in PTL 1, situations of recognized surrounding obstacles of a vehicle or a target trace of the self-vehicle can be presented on the on-vehicle display device or the like to allow a driver or an occupant to recognize a future traveling track.

CITATION LIST

Patent Literature

[PTL 1] JP-A-2008-191781

SUMMARY OF INVENTION

Technical Problem

A traveling track of a vehicle can be displayed to allow a driver or an occupant to recognize future steering control, but acceleration and deceleration control may not be expressed. Therefore, there is a problem that the driver or the occupant may still feel discomfort in unexpected acceleration and deceleration control in some cases. The traveling track is a result obtained by deciding traveling control content and it may not be indicated that a series of traveling control is decided based on a certain purpose. Therefore, the problem that the driver or the occupant may not still comprehend an intention by which a vehicle is driven and may feel discomfort remains.

In view of the foregoing and other problems, an object of the invention is to reduce discomfort or uneasiness which a driver or an occupant may feel in automatic traveling control of a vehicle.

Solution to Problem

In order to resolve the forgoing problem, according to an aspect of the invention, there is provided a traveling control system that is mounted on a vehicle and performs traveling control on the vehicle. The traveling control system includes: an externality recognition information acquisition unit that receives externality recognition information from an externality sensor ascertaining objects outside the self-vehicle including an obstacle and another vehicle on a route or receives information from a roadside through out-of-vehicle communication to acquire the externality recognition information; a driving behavior decision unit that decides driving behavior content to be taken by the self-vehicle based on the externality recognition information received from the externality recognition information acquisition unit and self-vehicle information which is information including a position and a traveling speed of the self-vehicle; a driving behavior cause specifying unit that specifies a driving behavior cause as a reason why the driving behavior content received from the driving behavior decision unit is decided; a driving behavior information output unit that outputs the driving behavior content and the driving behavior cause specified in regard to the driving behavior content; a driving behavior information acquisition unit that acquires driving behavior information which is information deciding traveling control content of the vehicle and indicating a driving behavior of the vehicle and includes information regarding a kind of selected driving behavior and a cause to select the driving behavior; and a driving behavior information output unit that includes at least one of a display unit displaying the driving behavior information and an audio output unit outputting content of the driving behavior information through sound and presents the kind of driving behavior included in the driving behavior information along with a driving behavior cause.

Advantageous Effects of Invention

According to the invention, it is possible to reduce discomfort or uneasiness felt by a driver or an occupant in automatic traveling control of a vehicle.

BRIEF DESCRIPTION OF DRAWINGS

FIG. 1 is a functional block diagram illustrating an example of the configuration of a traveling control system 1 according to a first embodiment of the invention.

FIG. 2 is an explanatory diagram illustrating an example of a state transition diagram of traveling control of an on-vehicle control device 10 according to the first embodiment of the invention.

FIG. 3 is an explanatory diagram illustrating an example of a data structure of a control discomfort pattern data group 124 maintained by the on-vehicle control device 10 according to the first embodiment of the invention.

FIG. 4 is an explanatory diagram illustrating an example of a data structure of a control event notification pattern data group 222 maintained by an on-vehicle display device 20 according to the first embodiment of the invention.

FIG. 5 is an explanatory diagram illustrating the flow of a traveling control process performed by the on-vehicle control device 10 according to the first embodiment of the invention.

FIG. 6 is an explanatory diagram illustrating the flow of a driving behavior content decision process in a normal traveling control mode performed in the on-vehicle control device 10 according to the first embodiment of the invention.

FIG. 7 is an explanatory diagram illustrating the flow of a traveling control content decision process in the normal traveling mode performed in the on-vehicle control device 10 according to the first embodiment of the invention.

FIG. 8 is a diagram illustrating the flow of a traveling control information output process performed by the on-vehicle control device 10 and an on-vehicle display device 20 according to the first embodiment of the invention.

FIG. 9 is an explanatory diagram illustrating an example of the format of an externality recognition information message output by the on-vehicle control device 10 according to the first embodiment of the invention.

FIG. 10 is an explanatory diagram illustrating the flow of a discomfort determination process performed by the on-vehicle control device 10 according to the first embodiment of the invention.

FIG. 11 is an explanatory diagram illustrating an example of the format of a control event message output by the on-vehicle control device 10 according to the first embodiment of the invention.

FIG. 12 is a diagram illustrating the flow of an HMI output content decision process performed by the on-vehicle display device 20 according to the first embodiment of the invention.

FIG. 13 is an explanatory diagram illustrating a signal intersection scene which is an example of a specific scene for describing an operation of the traveling control system 1 according to the first embodiment of the invention.

FIG. 14 is an explanatory diagram illustrating an example of a display method in the signal intersection scene by the on-vehicle display device 20 according to the first embodiment of the invention.

FIG. 15 is an explanatory diagram illustrating a lane changing scene which is an example of the specific scene for describing an operation of the traveling control system 1 according to the first embodiment of the invention.

FIG. 16 is an explanatory diagram illustrating an example of a display method in the lane changing scene by the on-vehicle display device 20 according to the first embodiment of the invention.

FIG. 17 is an explanatory diagram illustrating the flow of a discomfort determination process performed by an on-vehicle control device 10 according to a second embodiment of the invention.

FIG. 18 is an explanatory diagram illustrating an example of a data structure of a control discomfort pattern data group maintained by the on-vehicle control device 10 according to the second embodiment of the invention.

FIG. 19 is an explanatory diagram illustrating a signal intersection scene which is an example of a specific scene for describing an operation of the traveling control system 1 according to a third embodiment of the invention.

FIG. 20 is an explanatory diagram illustrating an example of a display method in the signal intersection scene by the on-vehicle display device 20 according to the third embodiment of the invention.

DESCRIPTION OF EMBODIMENTS

Hereinafter, embodiments of the invention will be described with reference to the drawings.

First Embodiment

FIG. 1 is a functional block diagram illustrating an example of the configuration of a traveling control system 1 according to a first embodiment of the invention.

As illustrated in FIG. 1, a traveling control system 1 according to the embodiment is a system that is mounted on a vehicle 2 and automatically controls all or apart of traveling of the vehicle 2. The traveling control system 1 includes an on-vehicle control device 10, an on-vehicle display device 20, a wireless communication unit 30, a self-vehicle positioning device 40, an externality sensor group 50, a vehicle sensor group 60, and an actuator group 70.

The on-vehicle control device 10 is, for example, an electronic control unit (ECU) mounted on the vehicle 2 and includes a processing unit, a storage unit 120, and a communication unit 130. The shape of the on-vehicle control device 10 is not particularly limited, but may be, for example, a traveling control device that realizes advanced driver assistance systems (ADAS) of the vehicle 2, may be integrated into a device of the externality sensor group 50, or may be an external device such as a smartphone connected to a vehicle network by a user of the vehicle 2.

The processing unit is configured to include a central processing unit (CPU) 100 and a memory such as a random access memory (RAM) and executes a predetermined operation program stored in the storage unit 120 to perform a process of realizing a function of the on-vehicle control device 10.

The storage unit 120 is configured to include, for example, a storage device such as a hard disk drive (HDD), a flash memory, or a read-only memory (ROM) and stores a program to be executed by the processing unit and a data group necessary to realize the system. In the embodiment, the storage unit 120 particularly stores programs such as a relevant information acquisition unit 101 that acquires various kinds of information (a surrounding road map, traveling route information, self-vehicle position information, externality recognition information, vehicle sensor information, and the like) necessary at the time of decision of traveling control of the vehicle 2, an externality recognition information integration unit 102 that manages out-of-vehicle object information acquired from the wireless communication unit 30 or the externality sensor group 50 in an integrated manner, a map position estimation unit 103 that estimate the position of the self-vehicle or an out-of-vehicle object group on a road map, a driving behavior decision unit 104 that decides a driving behavior such as a right or left turn or a lane change to be taken by the self-vehicle, a driving behavior cause specifying unit 105 that specifies a cause target object of a driving behavior decided by the driving behavior decision unit 104, a traveling control decision unit 106 that decides traveling control such as steering or acceleration and deceleration to be taken by the self-vehicle, a traveling control cause specifying unit 107 that specifies a cause target object of traveling control decided by the traveling control decision unit 106, a cause target object information extraction unit 108 that extracts information regarding the cause target object specified by the driving behavior cause specifying unit 105 or the traveling control cause specifying unit 107, a control discomfort determination unit 109 that determines whether content of the driving behavior or the traveling control decided by the driving behavior decision unit 104 or the traveling control decision unit 106 gives discomfort, and a traveling control information output unit 110 that outputs information regarding the decided driving behavior or traveling control to the outside, and an externality recognition information output unit 111 that outputs externality recognition information managed in an integrated manner by the externality recognition information integration unit 102, a surrounding road map data group 121, a self-vehicle information data group 122, an externality recognition information data group 123, and a control discomfort pattern data group 124.

The surrounding road map data group 121 of the on-vehicle control device 10 is a collective of data related to a digital road map for surrounding roads of the vehicle 2 necessary to decide a driving behavior or traveling control and includes information regarding a road network structure, attributes (types of roads, speed limits, movement directions, and the like), shapes (road lane shapes, intersection shapes, and the like), landmarks (traffic signs, paints on road surfaces, and the like), and the like. The surrounding road map data group 121 is acquired from the on-vehicle display device 20 in the embodiment. A surrounding map information transmission unit 202 of the on-vehicle display device 20 frequently transmits map data of surrounding roads necessary for the on-vehicle control device 10 via an on-vehicle network or the like according to the position of the vehicle 2 on a map. Thus, the relevant information acquisition unit 101 of the on-vehicle control device 10 is configured to frequently store the map data of the surrounding roads of the vehicle 2 in the surrounding road map data group 121 by acquiring the map data. A method of managing the surrounding road map data group 121 is not particularly limited to the scheme described in the embodiment, but all of the map data may be stored in advance in the on-vehicle control device 10 or the map data may be received from the outside of the vehicle 2 via the wireless communication unit 30.

The self-vehicle information data group 122 of the on-vehicle control device 10 is a collective of data related to, for example, positional information of the self-vehicle and information which can be acquired from the vehicle sensor group 60 and represents a traveling state or the like of the self-vehicle. The positional information of the self-vehicle represents data indicating geographic positional information of the self-vehicle positioned by the self-vehicle positioning device 40 or data related to the position of the self-vehicle, such as an estimation result of the map position estimation unit 103.

The externality recognition information data group 123 of the on-vehicle control device 10 is, for example, a collective of data related to out-of-vehicle object information, such as a detection result of an obstacle (another vehicle, a bicycle, a pedestrian, a fallen object, or the like) or a characteristic object (a traffic sign, a white line, a landmark, or the like) around the vehicle 2 acquired from the externality sensor group 50 or information (information regarding other vehicles, signal information, a traffic situation, or the like) regarding an external environment of the vehicle 2 acquired via the wireless communication unit 30.

The control discomfort pattern data group 124 of the on-vehicle control device 10 is a collective of data indicating a pattern selected because a driving behavior or traveling control is considered to cause discomfort which a driver or an occupant may feel.

The communication unit 130 is configured to include a network card which conforms with a communication standard such as Ethernet (registered trademark) or Controller Area Network (CAN), and transmits and receives data to and from other devices mounted on the vehicle 2 based on various protocols. A connection form between the communication unit 130 and other devices mounted on the vehicle 2 is not limited to wired connection such as Ethernet (registered trademark), but may be short-range wireless connection such as Bluetooth (registered trademark) or a wireless Local Area Network (LAN).

The on-vehicle display device 20 is, for example, a display device mounted on the vehicle 2 and includes a processing unit, a storage unit 220, a communication unit 230, a screen input and output unit 240, and an audio input and output unit 250. The form of the on-vehicle display device 20 is not particularly limited, but may be, for example, a navigation device or an external device such as a smartphone connected to a vehicle network by a user of the vehicle 2.

The processing unit is configured to include a CPU 200 and a memory such as a RAM and executes a predetermined operation program stored in the storage unit 220 to perform a process of realizing a function of the on-vehicle display device 20.

The storage unit 220 is configured to include, for example, a storage device such as an HDD, a flash memory, or a ROM and stores a program to be executed by the processing unit and a data group necessary to realize the system. In the embodiment, the storage unit 220 particularly stores programs such as a traveling route decision unit 201 that decides a route on a road map which is to be traveled by the vehicle 2 or is recommended to be traveled, a surrounding map information transmission unit 202 that transmits map information regarding the surroundings of the vehicle 2 necessary for a process of the on-vehicle control device 10, a traveling route information transmission unit 203 that transmits traveling route information decided by the traveling route decision unit 201 to the on-vehicle control device 10, a traveling control information acquisition unit 204 that acquires traveling control information output from the on-vehicle control device 10, and an HMI output control unit 205 that outputs a screen or audio based on the traveling control information acquired by the traveling control information acquisition unit, a road map data group 221, a control event notification pattern data group 222, and an externality recognition information data group 223.

The road map data group 221 of the on-vehicle display device 20 is a collective of data related to a digital road map including information regarding a road network structure, attributes (types of roads, speed limits, movement directions, and the like), shapes (road lane shapes, intersection shapes, and the like), landmarks (traffic signs, paints on road surfaces, and the like), and the like. There is no limit on an area of a targeting road map. For example, road map data of the whole world may be included, only road map data related to a specific region or nation such as Europe or USA may be included, or only local road map data of the surroundings of the position of the vehicle 2 may be included. In the present specification, a road means a road on which a vehicle can travel and is not limited to a public road. The road may include a private road or may include a traveling track in a facility such as a parking lot.

The control event notification pattern data group 222 of the on-vehicle display device 20 is a collective of data indicating a pattern which decides how to notify the driver or the occupant of control event information supplied from the on-vehicle control device 10 through the screen input and output unit 240 or the audio input and output unit 250.

The externality recognition information data group 223 of the on-vehicle display device 20 stores, for example, integrated externality recognition information supplied from the on-vehicle control device 10.

The communication unit 230 is configured to include a network card which conforms with a communication standard such as Ethernet (registered trademark) or CAN, and transmits and receives data to and from other devices mounted on the vehicle 2 based on various protocols. A connection form between the communication unit 230 and other devices mounted on the vehicle 2 is not limited to wired connection such as Ethernet (registered trademark), but may be short-range wireless connection such as Bluetooth (registered trademark) or a wireless LAN.

The wireless communication unit 30 includes, for example, a network card which conforms with a long range wireless communication standard such as Long Term Evolution (LTE) or a short range wireless communication standard such as wireless LAN or Dedicated Short Range Communications (DSRC) and is configured to be able to perform data communication with at least one of, for example, a server that supports traveling of one vehicle or a plurality of vehicles, one roadside device or a plurality of roadside devices installed on roads, the wireless communication units 30 mounted on one or a plurality of other vehicles, and one communication terminal or a plurality of communication terminals (not illustrated) carried by people.

The self-vehicle positioning device 40 is a device that measures a geographic position of the vehicle 2 and supplies information regarding the geographic position and corresponds to, for example, a global navigation satellite system (GNSS) reception device. The self-vehicle positioning device 40 may be configured to simply supply a positioning result based on radio waves received from GNSS satellites or may be configured to perform position interpolation and error correction utilizing information, such as a movement speed or a traveling azimuth angle of the vehicle 2, which can be acquired from the externality sensor group 50 and/or the vehicle sensor group 60.

The self-vehicle positioning device 40 may be a device other than the GNSS reception device as long as the device is a device that measures a geographic position of the vehicle 2. For example, the self-vehicle positioning device 40 may acquire information for identifying a road on which the vehicle 2 is traveling and information (for example, information indicating a distance from a start point of the road) indicating the position of the vehicle 2 on the road from a roadside device and may measure the geographic position of the vehicle 2 based on the information. The information indicating the position of the vehicle 2 acquired by the self-vehicle positioning device 40 is generally a set of coordinate values such as latitude and longitude to be described below, but any information other than the above information may be used as long as the information can be used to specify the road on which the vehicle 2 is traveling. For example, the information indicating the position of the vehicle 2 may be information indicating a road on which the vehicle 2 is traveling and the position of the vehicle on the road.

The externality sensor group 50 is a sensor group that can recognize obstacles (other vehicles, bicycles, pedestrians, fallen objects, or the like) and/or characteristic objects (traffic signs, white lines, landmarks, or the like) in a given range around the vehicle 2 and corresponds to, for example, a camera device, a radar, a laser radar, or a sonar. The externality sensor group 50 outputs information (for example, a relative distance and a relative angle from the vehicle 2) regarding a detected obstacle or characteristic object around the vehicle 2 to an on-vehicle network, and thus the on-vehicle control device 10 is configured to be able to acquire the output result through an on-vehicle network. In the embodiment, the externality sensor group 50 is configured to perform a process of detecting an obstacle or a characteristic object. However, the externality sensor group 50 may output unprocessed data and another device such as the on-vehicle control device 10 may perform the detection process.

The vehicle sensor group 60 is a device group that detects various component states (for example, a traveling speed, a steering angle, an accelerator operation amount, and a brake operation amount) of the vehicle 2 and periodically outputs the detected state amounts to, for example, the on-vehicle network such as a CAN. Devices connected to the on-vehicle network including the on-vehicle control device 10 are configured to be able to acquire state amounts of various components.

The actuator group 70 is a device group that controls control components such as a steering, a brake, and an accelerator deciding a motion of the vehicle 2 and is configured to control a motion of the vehicle 2 based on operation information of a handle, a brake pedal, an accelerator pedal, and the like by a driver or a target control value output from the on-vehicle control device 10.

A relation between a "driving behavior" and "traveling control" in the embodiment will be described. In the embodiment, the "driving behavior" represents a type of behavior indicting that a driving entity (the driver or the traveling control system) controls or is to control the vehicle with a certain purpose. Specifically, "normal traveling", "left turn", "right turn", "lane change", and "parking or stopping" corresponds to types of driving behaviors.

On the other hand, in the embodiment, the "traveling control" represents a type of a characteristic series of actuator control performed to realize a purpose such as a driving behavior. Therefore, a different type of traveling control can be considered according to a targeting driving behavior. For example, in a case in which the driving behavior is "normal traveling", "acceleration traveling control", "deceleration traveling control", "normal traveling control", or the like can be assumed as the type of traveling control. On the other hand, in a case in which the driving behavior is "lane change", "lane keeping traveling control", "lane change traveling control", or the like correspond to the type of traveling control is assumed.

A person who has an ultimate purpose to reach a destination determines a driving behavior to be taken according to a road shape or a situation of that occasion and drives the vehicle frequently changing the driving behavior (that is, controls the traveling of the vehicle). Even in a case in which the traveling control system is a driving entity as in an automatic driving system, similarly, a driving behavior to be taken is determined while a surrounding environment is recognized using a sensor or the like, and how to perform traveling control on the vehicle is decided based on the driving behavior.

FIG. 2 illustrates an example of a state transition diagram in a case in which the traveling control system 1 performs the traveling control of the vehicle 2. Reference numerals 301 to 305 denote "driving behavior" states in the vehicle 2 (hereinafter the driving behavior states are referred to as "modes"). Internal states (for example, 311 to 313 in the case in which a driving behavior is "normal traveling") included in the driving behavior states denote "traveling control" states in the driving behavior.

For example, a normal traveling mode 301 means a driving behavior state in which traveling is performed along a current road (a road or a lane). In the normal traveling mode 301, three types (states) of traveling control, normal traveling control 311, deceleration traveling control 312, acceleration traveling control 313, are defined. The deceleration traveling control 312 means a traveling control state in which the vehicle is decelerated and the acceleration traveling control 313 means a traveling control state in which the vehicle is accelerated. The normal traveling control 311 means all of the states which are not included in the deceleration traveling control 312 and the acceleration traveling control 313. In the normal traveling mode 301, the vehicle moves along the road while the traveling control state is changed according to a situation of a traveling environment. As described above, in the embodiment, the "traveling control" expresses characteristics of a series of actuator control performed to realize a purpose of the correspondent driving behavior and means, in the embodiment, that the "deceleration traveling control" and the "acceleration traveling control" are extracted as characteristic "traveling control" states. The invention is not limited to the types of traveling control defined in the embodiment. Note that any types of traveling control can be defined according to functions of the traveling control mounted on the vehicle 2. The same applies to the types of driving behaviors. The invention is not limited to the types of driving behaviors in the embodiment. For example, the normal traveling mode may be finely classified into, for example, a "following traveling mode" and a "single traveling mode" according to a control scheme, the lane change mode may be classified into, for example, an "overtaking mode" and the like according to a purpose, or the types of driving behaviors may be defined according to another classification axis.

A right turn mode 302 means, for example, a driving behavior state in which the vehicle turns right at an intersection or the like. In the right turn mode 302, two types (states) of traveling control, normal traveling control 320 and stopping control 321, are defined. The normal traveling control 320 is a state in which a steering angle or an acceleration or deceleration speed is controlled according to a traveling track of a right turn and the stopping control 321 is a state in which the vehicle stops and waits until an obstacle departs from or passes through a traveling track of the vehicle 2 because another obstacle is in the traveling track of the vehicle 2 or crosses the traveling track. The stopping control 321 corresponds to, for example, a state in which the vehicle waits for turning right because another vehicle enters an intersection from an opposite lane.

A left turn mode 303 means, for example, a driving behavior state in which the vehicle turns left at an intersection or the like. In the left turn mode 303, two types of traveling control, normal traveling control 330 and stopping control 331, are defined, as in the right turn mode 302. The stopping control 331 in the left turn mode 303 corresponds to, for example, a state in which the vehicle stops before a crosswalk in a case in which a pedestrian or a bicycle is crossing the crosswalk.

A lane change mode 304 means, for example, a driving behavior state in which the vehicle changes a lane during driving on a road of a plurality of lanes. In the lane change mode 304, two types of traveling control, lane keeping traveling control 340 and lane change traveling control 341, are defined. Normally, before transition to the lane change control, the vehicle is traveling while maintaining a current lane until safety of entrance to a lane of a change designation is confirmed. The lane keeping traveling control 340 means this control state. On the other hand, the lane change traveling control 341 means a state in which the safety of the entrance to the lane to the change destination is confirmed and the change in the lane is actually controlled. When the change in the lane is safely completed, the mode returns to the normal traveling mode 301.

A parking mode 305 means, for example, a driving behavior state in which the vehicle 2 is parked at a predetermined location in a parking lot or on a road. In the parking mode 305, two types of traveling control, normal traveling control 350 and stopping control 351, are defined. The normal traveling control 350 is a state in which a steering angle or an acceleration or deceleration speed is controlled according to a traveling track for parking and the stopping control 351 is a state in which the vehicle stops and waits until another obstacle departs from or passes through a traveling track of the vehicle 2 because the obstacle is in the traveling track of the vehicle 2 or crosses the traveling track.

An example of the data structure of the control discomfort pattern data group 124 of the on-vehicle control device 10 will be described with reference to FIG. 3.

The control discomfort pattern data group 124 is a collective of data indicating information regarding control events which are likely to give discomfort to the driver or the occupant. In the embodiment, the control event is, for example, a characteristic change in driving behavior content or traveling control content. This corresponds to a state transition event in the traveling control state transition diagram illustrated in FIG. 2. The transition of a mode level in FIG. 2 corresponds to a change in the driving behavior content and a mode internal state transition corresponds to a change in the traveling control content.

A type of driving behavior 401 and a type of traveling control 402 indicate types of driving behaviors or traveling control to which the correspondent control event is related. In a case in which the correspondent control event represents a change in the driving behavior content, a value indicating transition to a mode of a certain driving behavior is stored in the type of driving behavior 401 and a value ("Any" in the example of FIG. 3) indicating non-limitation is stored in the type of traveling control 402. On the other hand, when the control event represents a change in the traveling control content, a value indicating a change in the traveling control content in regard to a certain driving behavior mode is stored in the type of driving behavior 401 and a value indicating transition to a certain traveling control state is stored in the type of traveling control 402. For example, in the first row of FIG. 3, since the driving behavior mode is an event of transition to a left turn, "left turn" is stored in the type of driving behavior 401 and "Any" is stored in the type of traveling control 402. For example, in the ninth row of FIG. 3, since the traveling control state in the normal traveling mode is an event of transition to deceleration traveling, "normal traveling" is stored in the type of driving behavior 401 and "deceleration" is stored in the type of traveling control 402.

A cause 403 is information regarding causes of transition of the driving behavior or the traveling control state. As the causes of the state transition, for example, causes related to surrounding obstacles such as stopped vehicles, low-speed vehicles, preceding vehicles, and pedestrians, causes related to road shapes, rules or traffic states such as curves, speed limits, signals, and congestion, and causes related to setting of a user can be considered. For example, in the first row of FIG. 3, "set route" is designated as a cause of transition to the left turn mode. This means an event of transition to the left turn mode according to left turn designation at a correspondent intersection in a traveling route up to a destination set by the user or the traveling control system. For example, in the fourth row of FIG. 3, "user designation" is designated as a cause. This means an event of transition to the parking mode when a parking instruction is received from the driver or the occupant via a human machine interface (HMI) device such as the on-vehicle display device 20. For example, in the ninth row of FIG. 3, it is meant that a cause of transition to a deceleration control state in the normal traveling mode is a signal.

A distinctive condition 404 represents a condition of the cause 403 to which the entry is applied. For example, in the ninth row, "signal" is set as the cause 403 and "signal state≠red" is set as the distinctive condition 404. That is, the entry of the ninth row is not applied to all the deceleration in which the signal is the cause, but is applied only in a case in which the signal state is not red. This is because deceleration with a red signal does not give discomfort, but deceleration with a blue signal may give discomfort. In a case in which the on-vehicle control device 10 acquires and uses information indicating that an opposite signal state transitions from blue to yellow after a given time from a road side through the externality sensor group 50 or the like of the vehicle 2, the vehicle 2 is considered to decelerate even in the blue signal. Here, the condition is described for the sake of simplicity. However, in practice, for example, a function of regulating distinctive conditions is defined and a reference to the function is stored.

In a discomfort level 405, for example, discomfort levels felt by a drive or an occupant with respect to control events regulated in the type of driving behavior 401, the type of traveling control 402, and the cause 403 are digitized. The discomfort levels may be set fixedly through preliminarily statistical analysis or may be changed dynamically while learning is performed in response to control on reception of discomfort of the driver or the occupant through an HMI device such as the on-vehicle control device 10 or the like. In the embodiment, the discomfort levels are classified into four stages (0 to 3), but the invention is not particularly limited as long as the discomfort levels can be expressed.

An example of the data structure of the control event notification pattern data group 222 of the on-vehicle display device 20 will be described with reference to FIG. 4.

The control event notification pattern data group 222 is a collective of data indicating a pattern of how the driver or the occupant is notified of control event information supplied from the on-vehicle control device 10 through the screen input and output unit 240 and/or the audio input and output unit 250.

A type of driving behavior 411, a type of traveling control 412, a cause 413 correspond to 401 to 403 of the control discomfort pattern data group 124, respectively.

Audio notification setting 414 is setting of whether content of control event information is notified of through sound when the control event information corresponding to an entry is received. In the embodiment, for example, one value of "notification" "non-notification", "non-designation" is stored. The "notification" and "non-notification" represent that the user explicitly performs setting. The "notification" means that audio notification is performed and the "non-notification" means that no audio notification is performed. The "non-designation" represents that the user does not explicitly perform setting.

The number of notifications 415 represents how many times the audio notification is performed in regard to the entry. The number of notifications is used in a case in which the audio notification setting 414 is "non-designation" and is not used in a case in which the user explicitly sets necessity and non-necessity of the audio notification.

Next, an operation of the traveling control system 1 will be described. The on-vehicle control device 10 in the traveling control system 1 decides the traveling control content based on a surrounding situation of the vehicle 2 and performs a traveling control process of outputting a target control value to the actuator group 70 as a main process.

A flow 450 of the traveling control process performed by the traveling control system 1 according to the embodiment is illustrated in FIG. 5.

The traveling control decision unit 106 of the on-vehicle control device 10 first waits for a predetermined time (step (S) 451) and subsequently acquires self-vehicle information from the self-vehicle information data group 122 (step 452). Here, the waiting of the predetermined time is waiting of a time until a trigger to calculate the traveling control content is applied. The trigger to calculate the traveling control content may be applied to be performed for each given time with a timer, or necessity to recalculate the traveling control content may be detected and the trigger may be applied on demand. The self-vehicle information acquired in step 452 includes, for example, positional information, traveling state information, and traveling route information of the vehicle 2. The positional information of the vehicle 2 may be information regarding latitude and longitude acquired from the self-vehicle positioning device 40 or may be positional information on a road map such as a road link in which the vehicle 2 is present. The traveling state information of the vehicle 2 is, for example, information such as speed, a traveling azimuth or a traveling direction on a road or information such as acceleration, a brake state, an accelerator position, and a gear position acquired from the vehicle sensor group 60 or the like. The traveling route information of the vehicle 2 is, for example, information regarding a route which is decided by the traveling route decision unit 201 of the on-vehicle display device 20 and along which the vehicle 2 is to travel from now or a recommended traveling route on a road map. Such self-vehicle information is acquired from an appropriate external device or the like via a vehicle network or the like by the relevant information acquisition unit 101 of the on-vehicle control device 10 and is stored in the self-vehicle information data group 122. For example, in a flow described exemplifying the traveling route information, the traveling route information transmission unit 203 of the on-vehicle display device 20 outputs the traveling route information on the on-vehicle network via the communication unit 230, and then the relevant information acquisition unit 101 of the on-vehicle control device 10 receives the traveling route information and stores the traveling route information in the self-vehicle information data group 122.

Next, in step 453, the traveling control decision unit 106 of the on-vehicle control device 10 acquires the externality recognition information related to a process to be described below from the externality recognition information data group 123. The information regarding the out-of-vehicle object information appropriately acquired from the externality sensor group 50 or the wireless communication unit 30 is stored in the externality recognition information data group 123 by the relevant information acquisition unit 101. For example, a detection result of a surrounding obstacle or characteristic object of the vehicle 2 or information (another vehicle information, signal information, traffic situation, or the like) regarding an external environment of the vehicle 2 acquired via the wireless communication unit 30 are included.

When step 453 is completed, the process proceeds to a driving behavior content decision process (S454) of deciding driving behavior content to be taken based on the information acquired in step 452 or step 453. The driving behavior content decision process corresponds to the process of deciding the state transition between the modes in the traveling control state transition diagram of FIG. 2. Therefore, the logic of the driving behavior content decision process is different according to the driving behavior mode.

As a specific example of the driving behavior content decision process, a flow 550 of the driving behavior content decision process in the normal traveling mode is illustrated in FIG. 6.

The driving behavior decision unit 104 of the on-vehicle control device 10 first confirms whether the mode is designated by the user (step 551). In a case in which the traveling control system 1 is configured such that the driver or the occupant can designate a driving behavior taken by the traveling control system 1 using the HMI device such as the on-vehicle display device 20, Yes is taken in step 551 when the driving behavior is designated by the user. Then, the process proceeds to step 561, the driving behavior decision unit 104 changes the current driving behavior mode to a mode designated by the user and the driving behavior cause specifying unit 105 sets the driving behavior decision cause to "user designation". Then, the process proceeds to step 571, the cause target object information extraction unit 108 extracts target object information related to the set driving behavior decision cause, and the process ends. Here, the target object corresponds to an object included in the externality recognition information acquired in step 453 of the flow 450 of the traveling control process. In this case, since the driving behavior decision cause is "user designation" and there is no correspondent target object particularly, a null set is set in the target object information.

Automatic parking is considered as an example of the designation of the driving behavior by the user. When the driver automatically parks the vehicle 2, an instruction for the automatic parking is output to the traveling control system 1 via the HMI such as the on-vehicle display device 20. The on-vehicle control device 10 receives information regarding the instruction via the communication unit 130, sets mode designation information to "parking mode", and stores the mode designation information in the storage unit 120. In step 551, the driving behavior decision unit 104 recognizes the parking mode designation by the user with reference to the mode designation information. Then, the process proceeds to step 561 and the above-described process is performed.

The process returns to step 551. In a case in which the driving behavior is not designated by the user (No in step 551), it is confirmed in step 552 whether the vehicle 2 arrives at a parking schedule spot. The parking schedule spot is, for example, a final or intermediate designation set in the traveling route in the automatic driving or the like. In this case, whether the vehicle arrives at the designation serves as a determination standard of step 552. When it is determined in step 552 that the vehicle arrives at the parking schedule spot, the driving behavior decision unit 104 changes the current driving behavior mode to the parking mode 305 and the driving behavior cause specifying unit 105 sets the driving behavior decision cause to "set route" in step 562. Here, the "set route" means that the driving behavior content is decided according to the instruction in a case in which the traveling route is decided in advance in the automatic driving or the like. For example, whether the vehicle arrives at the parking schedule spot may be determined according to whether a distance between the position of the vehicle 2 and the parking schedule spot on the route is equal to or less than a given distance or may be determined according to whether an assumed arrival time up to the parking schedule spot is equal to or less than a given time. When step 562 ends, the process proceeds to step 571. Then, the cause target object information extraction unit 108 extracts the target object information related to the foregoing set driving behavior decision cause and the process ends. In this case, since there is no correspondent target object particularly, a null set is set in the target object information.

The process returns to step 552. In a case in which the vehicle 2 has no relation with the parking schedule spot (No in step 552), it is confirmed in step 553 whether the vehicle 2 arrives at a left turn schedule spot. Like the parking schedule spot of step 552, it is determined whether the vehicle approaches a spot at which a left turn is instructed in the set traveling route. When the vehicle 2 arrives at the left turn schedule spot (Yes in step 553), the driving behavior mode is changed to the left turn mode 303 in step 563, the driving behavior decision cause is set to "set route", and the process proceeds to step 571.

In step 553, when the vehicle 2 has no relation with the left turn schedule spot, the process proceeds to step 554 and the same process is performed on a right turn schedule spot. When the vehicle 2 has no relation with the right turn schedule spot in step 554, the process proceeds to step 555 and the same process is performed on a lane change schedule spot.

Next, the process proceeds to step 556 to confirm whether there is a parked or stopped vehicle on the preceding same lane. Whether there is the parked or stopped vehicle can be determined, for example, by conforming whether another vehicle is stopped on the traveling lane of the vehicle 2 based on the externality recognition information data group 123 obtained from the wireless communication unit 30 or the externality sensor group 50. Here, in a case in which the vehicle 2 can pass without problem on the same lane because of partial protrusion of the parked or stopped vehicle even when the parked or stopped vehicle is on the same lane, it is not considered that the parked or stopped vehicle is on the same lane. In a case in which there is the parked or stopped vehicle, the driving behavior mode is changed to the lane change mode 304, the driving behavior decision cause is set to "parked or stopped vehicle", and the process proceeds to step 571. In step 571, information regarding the parked or stopped vehicle is extracted with reference to the externality recognition information data group 123.

In a case in which the parked or stopped vehicle is not on the same lane in step 556, the process proceeds to step 557 to confirm whether there is a low-speed vehicle on the same lane. Whether there is the low-speed vehicle is determined, as in step 556, by confirming whether there is a vehicle traveling unnecessarily at a low speed with respect to a traveling environment (speed limit, congestion of a road, traffic rules, or the like), referring to a preceding vehicle traveling on the same lane of the vehicle 2 or the data of the surrounding environment from the externality recognition information data group 123. In a case in which there is the low-speed vehicle, the driving behavior mode is changed to the lane change mode 304, the driving behavior decision cause is set to "low-speed vehicle", and the process proceeds to step 571. In step 571, information of the low-speed vehicle is extracted referring to the externality recognition information data group 123.

In a case in which the low-speed vehicle is not on the same lane in step 557, the process proceeds to step 580 and the driving behavior mode is set to the normal traveling mode 301. That is, this means that the driving behavior mode is not changed. Then, after the process of step 580 is completed, the flow of the process ends.

As described above, the flow 550 of the driving behavior content decision process is a logic tree for determining the driving behavior mode state transition. Therefore, in the example of FIG. 6, the example of the state transition determination of the normal traveling mode 301 has been described. Naturally, there are other logic trees in other driving behavior modes. The state transition determination of the normal traveling mode 301 is not limited to the content indicated by the flow 550 of the driving behavior content decision process either, but any logic tree can be used. In the embodiment, the characteristic points particularly in the flow 550 of the driving behavior content decision process are the specifying of the causes at the time of the state transition determination (steps 561 to 567) and the extraction of the information regarding the target object (step 571).

The process returns to the flow 450 of the traveling control process of FIG. 5. When the driving behavior content decision process of step 454 ends, the traveling control content decision process (step 455) is performed. The traveling control content decision process is a process of deciding the traveling control content based on the driving behavior mode decided in the driving behavior content decision process (step 454) and corresponds to the process of deciding the mode internal state transition in the traveling control state transition diagram of FIG. 2. Therefore, the logic of the traveling control content decision process is different according to the driving behavior mode.

As a specific example of the traveling control content decision process, an example of a flow 600 of the traveling control content decision process in the normal traveling mode is illustrated in FIG. 7.

The traveling control decision unit 106 of the on-vehicle control device 10 first calculates a target track based on the self-vehicle information and the externality recognition information acquired in step 452 and 453 of the flow 450 of the traveling control process (step 601). The target track is calculated according to, for example, the scheme described in PTL 1. Next, a target steering angle and a target vehicle speed are calculated based on the target track calculated in step 601 (respectively in steps 602 and 603). In a known travel control device, a control target value in the actuator group 70 is calculated and the traveling control process ends. However, the embodiment is characterized in that logic for determining a subsequent traveling control state change is included.

In steps 604 and 605, it is determined whether the target vehicle speed calculated in step 603 is less than a current vehicle speed by α (variable) or more or greater than the current vehicle speed α or more. In a case in which the target vehicle speed is less than the current vehicle speed by α or more (Yes in step 604), the vehicle 2 is meant to decelerate and the subsequent traveling control state is set to "deceleration traveling" (step 606). This corresponds to the deceleration traveling state 311 of the normal traveling mode 301 in the state transition diagram of FIG. 2. Conversely, in a case in which the target vehicle speed is greater than the current vehicle speed α or more (Yes in step 605), the vehicle 2 is meant to accelerate and the subsequent traveling control state is set to "acceleration traveling" (step 607). This corresponds to the acceleration traveling state 312 of the normal traveling mode 301 in the state transition diagram of FIG. 2. In a case in which the target vehicle speed is within a range of ±α of the current vehicle speed (No in step 605), the subsequent traveling control state is set to "normal traveling" (step 608). The variable α may be a given value, may be changed according to the value of a current vehicle speed in such a manner that, for example, the value of α is larger as the current vehicle speed is larger, or may be changed according to a road attribute, a surrounding obstacle, weather, a visibility situation, or the like.

When the subsequent traveling control state is decided, the traveling control decision unit 106 compares the subsequent traveling control state with the current traveling control state and confirms whether the traveling control state is changed in step 609. In a case in which the traveling control state is changed, the traveling control cause specifying unit 107 specifies a cause of a change in the travel control state, that is, a main cause for deciding the target vehicle speed, and further extracts information regarding the target object which is the main cause with reference to the externality recognition information data group 123 (step 610). Although not described in the flow 600 of the process, the target vehicle speed in step 603 is calculated by evaluating vehicle speeds appropriate for obstacles (for example, other vehicles, pedestrians, or fallen objects) in the traveling route or the target track, road shapes (for example, curves, intersections, junctions, divisions, or a reduction in road widths), and traffic regulations (for example, a signal or a speed limit) and integrating the vehicle speeds. In this case, the main cause for deciding the target vehicle speed can be extracted by comparing the calculated target vehicle speed and a result calculated for an individual target object. For example, another vehicle (the preceding vehicle) and a signal of the intersection are assumed to be on the traveling route in which the speed limit is 50 km/h. In a case in which an optimum vehicle speed calculated for another vehicle is 50 km/h and an optimum vehicle speed calculated at a signal of an intersection is 30 km/h, the lower value 30 km/h is the target vehicle speed. In this case, since the signal of the intersection is a main cause for deciding the target vehicle speed, "signal" is extracted as the cause of the change in the traveling control state and information regarding the signal is extracted as target object information in step 610. In the flow 600 of the process, the flow in which the cause of the change in the traveling control state in step 610 is specified again has been described. However, as described above, the main cause for deciding the target vehicle speed may be extracted in advance in the target vehicle speed calculation process (step 603) and the main cause may be referred to in step 610, so that process can be performed efficiently.

In the embodiment, since the traveling control state of the normal traveling mode is defined focusing on only the deceleration speed, a change in a turning direction has not been described. However, the invention is not limited to the change in the acceleration or deceleration speed direction state, but may include a flow of a process of confirming a change in a turning direction state as in the target vehicle speed by newly defining the traveling control state related to a turning direction.

As described above, the flow 600 of the traveling control content decision process is a process of calculating the target control value and detecting a change in the traveling control state defined in the state transmission diagram of FIG. 2. Therefore, in the example of FIG. 7, the example of the traveling control content decision process in the normal traveling mode 301 has been described. Naturally, another driving behavior mode including another traveling control state becomes a flow of another traveling control content decision process. On the other hand, the framework in which the target control value is calculated and the change in the traveling control state in the driving behavior mode is detected is invariant. Therefore, the description of the flow of the traveling control content decision process in the other driving behavior modes will be omitted.

The process returns to the flow 450 of the traveling control process of FIG. 5. When the traveling control content decision process (step 455) ends, the traveling control information output unit 110 transmits the target control value calculated in step 455 from the communication unit 130 to the actuator group 70 via the vehicle network or the like. Thereafter, the actuator group 70 realizes the traveling control of the vehicle 2 by appropriately controlling the operation of the vehicle 2 according to the received target control value.

Next, the process proceeds to a traveling control information output process of step 457. An example of a flow 650 of the traveling control information output process will be described with reference to FIG. 8.

In the traveling control information output process, two kinds of information, the externality recognition information retained by the on-vehicle control device 10 and the control event information at the time of a control event, are output. The former is information used for a device such as the on-vehicle display device 20 to frequently ascertain a situation out of the vehicle and is transmitted every time. The latter is information used to notify the user of information regarding a control event and is transmitted only when the control event is generated.

First, the externality recognition information output unit 111 of the on-vehicle control device 10 extracts the externality recognition information related to the traveling control from the externality recognition information data group 123 in step 681. The externality recognition information related to the traveling control is, for example, externality recognition information used to determine the driving behavior content decision process or the traveling control content decision process. Alternatively, the externality recognition information may be object information recognized within a given distance range from the vehicle 2 or may be object information recognized as information which has a possibility of mixture with the traveling route of the vehicle 2.

Next, the externality recognition information output unit 111 generates an externality recognition information message 671 based on the relevant externality recognition information extracted in step 681 and outputs the generated externality recognition information message 671 from the communication unit 130 to an on-vehicle network or the like (step 682).

FIG. 9 is an explanatory diagram illustrating an example of a format 720 of the externality recognition information message 671 transmitted by the on-vehicle control device 10 according to the embodiment. Here, header information related to a communication protocol is not illustrated.

The externality recognition information message 671 includes the number of objects 721 indicating the number of objects to be transmitted, an ID 722, a type 723, positional information 724, and attribute information 725 of each of the objects. The foregoing various kinds of information may be transmitted as one message as in the illustrated format of the control event message or may be divided into a plurality of arbitrary messages to be transmitted.

The ID 722 is an identifier for uniquely specifying a recognized target object.

The type 723 is an identifier for specifying the kind of target object and is, for example, a "vehicle" a "pedestrian, and a "signal".

The positional information 724 includes data indicating the positional information of a target object. The positional information may be information regarding latitude and longitude, may be a relative position (for example, a relative distance and a relative direction with respect to a target object) from the vehicle 2, or may be a position on a roadmap (for example, a relative position with respect to a link or the ID of a node and its reference point). The positional information 763 may include information regarding a speed, a movement direction, or the like.

The attribute information 725 is a data group representing a distinctive state of each target object. For example, in a case in which the target object is a "signal", the attribute information includes a current state (red, blue, or the like) of the signal or a subsequent switch timing (blue or the like after 5 seconds).

For example, the externality recognition information message 671 output in step 682 by the on-vehicle control device 10 is delivered to the on-vehicle display device 20 via an on-vehicle network. The externality recognition information acquisition unit 206 of the on-vehicle display device 20 receives the delivered externality recognition information message 671, analyzes the message according to the format 720 of the externality recognition information message, and acquires various kinds of information (step 691). Next, the externality recognition information acquisition unit 206 updates the externality recognition information data group 223 based on the acquired relevant externality recognition information (step 692).

The process of outputting the first externality recognition information is completed in the above-described way. Subsequently, the process proceeds to a process of outputting the control event information.

The traveling control information output unit 110 of the on-vehicle control device 10 first confirms whether a control event is generated in the driving behavior content decision process (step 454) and the traveling control content decision process (step 455) of the flow 450 of the traveling control process in step 651. The control event corresponds to a change in the driving behavior mode or a change in the traveling control state. In a case in which the control event is not generated (No in step 651), the process ends without further performing any process. In a case in which the control event is generated (Yes in step 651), the process proceeds to a discomfort determination process (step 653).

An example of a flow 700 of the discomfort determination process will be described with reference to FIG. 10. The control discomfort determination unit 109 of the on-vehicle control device 10 first acquires the generated control event information (step 701). Specifically, the control event information includes state transition content of the driving behavior mode or the traveling control state and a cause of the control event extracted at the time of the generation of the control event.

Next, referring to the type of driving behavior 401, the type of traveling control 402, and the cause 403 of the control discomfort pattern data group 124, it is confirmed whether there is a correspondent entry related to the control event (step 702). In a case in which there is the correspondent entry (Yes in step 702), the value of the correspondent discomfort level 405 is set as a discomfort level of the control event (step 703). Conversely, in a case in which there is correspondent entry, 0 (no discomfort) is set as the discomfort level. The above discomfort determination process ends.

The process returns to the flow 650 of the traveling control information output process of FIG. 8. Next, the traveling control information output unit 110 confirms whether the discomfort level specified in the discomfort determination process (step 652) is equal to or greater than a predetermined threshold (step 653). In a case in which the discomfort level is less than the predetermined threshold (No in step 653), the process ends without further performing any process. In a case in which the discomfort level is equal to or greater than the predetermined threshold (Yes in step 653), a control event message 670 is generated based on the control event information and the generated message is output from the communication unit 130 to an on-vehicle network or the like (step 654).

By determining necessity and non-necessity for outputting the control event information according to the discomfort level, it is possible to prevent unnecessary information from being transmitted. In the embodiment, as will be described below, the content of the control event and its cause are presented via the on-vehicle display device 20 based on the output control event information. However, when unnecessary information is included for the presentation, the driver or the occupant may feel annoyed. Accordingly, by narrowing down and outputting the control event which is likely to give discomfort, it is possible to reduce the annoyance felt by the driver or the occupant in the presentation of the information on the on-vehicle display device 20. As the threshold of the discomfort level in step 653, for example, a fixed threshold such as "discomfort level of 2 or more" may be set or a threshold may be dynamically changed according to a situation. Alternatively, the threshold may be changed so that the driver or the like can adjust whether to output the threshold through an HMI device.

FIG. 11 is an explanatory diagram illustrating an example of a format 750 of the control event message 670 transmitted by the on-vehicle control device 10 according to the embodiment. Here, header information related to a communication protocol is not illustrated.

The control event message 670 includes a type of control event 751, a type of driving behavior 752, a type of traveling control 753, a control event cause 754, a control event target object ID 755, and a discomfort level 756. The foregoing various kinds of information may be transmitted as one message as in the illustrated format of the control event message or may be divided into a plurality of arbitrary messages to be transmitted.

The type of control event 751 is used to identify whether the type of control event is a control event generated because of a change in the driving behavior mode or a control event generated because of a change in the traveling control state and is expressed as, for example, a "driving behavior change" and a "traveling control change", respectively.

The type of driving behavior 752 is the type of driving behavior mode after a control event is generated. In a case in which the type of control event 751 is the "driving behavior change", the type of driving behavior 752 represents a driving behavior mode in which the control event is generated. Conversely, in a case in which the type of control event 751 is the "traveling control change", a driving behavior mode at a current time point is simply represented.

The type of traveling control 753 is the type of traveling control state after a control event is generated. In a case in which the type of control event 751 is the "traveling control change", the type of traveling control 753 represents the traveling control state in which the control event is generated. Conversely, in a case in which the type of control event 751 is the "driving behavior change", a traveling control state at a current time point is simply represented.

The control event cause 754 includes information regarding a cause for generating the control event. The value corresponding to the cause 403 in the control discomfort pattern data group 124 in FIG. 3 is entered therein.

The control event cause target object ID 755 is an identifier of a target object corresponding to a cause for generating the control event. The control event cause target object ID 755 corresponds to the ID 722 included in the externality recognition information message 671, and detailed information (the type, the positional information, the attribute information, and the like) regarding the target object is assumed to be referred to from the ID 755. In the example of FIG. 11, the form in which only the ID of the cause target object is included has been described, but detailed information related to the cause target object may be included. The control event cause target object ID 755 may include IDs of a plurality of target objects. In this case, for example, information regarding the number of the IDs of the target objects included immediately before the control event cause target object ID 755 is stored (not displayed) and the IDs of the correspondent target objects are continuously disposed.

The discomfort level 756 represents a discomfort level of the control event specified in the flow 700 of the discomfort determination process.

The process returns to the flow 650 of the traveling control information output process of FIG. 8. When the process of step 654 is completed, the traveling control information output unit 110 of the on-vehicle control device 10 ends the traveling control information output process irrespective of the process in the on-vehicle display device 20. Then, the process returns to the flow 450 of the traveling control process of FIG. 5.

When the traveling control information output process (step 457) is completed in the flow 450 of the traveling control process of FIG. 5, the process returns to step 451 again to repeat the same process. By repeatedly performing a series of processes of recognizing a situation of the self-vehicle or externality (steps 452 and 453), deciding the content of the driving behavior or the traveling control based on the recognition result (step 456), outputting the target control value to the actuator group 70 based on the decided traveling control content, and notifying the on-vehicle display device 20 of the traveling control information as necessary during a short period (for example, 50 ms), the traveling control of the vehicle 2 by the traveling control system 1 is realized.

The process returns to the flow 650 of the traveling control information output process of FIG. 8. The control event message 670 output in step 654 by the on-vehicle control device 10 is delivered to the on-vehicle display device 20 via, for example, an on-vehicle network. The traveling control information acquisition unit 204 of the on-vehicle display device 20 receives the delivered control event message 670, analyzes the message according to the control event message format 750, and acquires various kinds of information (step 661). Next, the HMI output control unit 205 of the on-vehicle display device 20 performs an HMI output content decision process and decides the content to be output to the screen input and output unit 240 or the audio input and output unit 250 (step 662).

An example of a process flow 800 of the HMI output content decision process will be described with reference to FIG. 12. First, the HMI output control unit 205 of the on-vehicle display device 20 confirms whether the discomfort level of the received control event is equal to or greater than a threshold used to determine whether to perform audio output (step 801). In a case in which the discomfort level is less than the threshold (No in step 801), the process proceeds to step 805 to confirm whether the subsequent discomfort level is equal to or greater than a threshold used to determine whether to perform screen output. In a case in which the subsequent discomfort level is less than the threshold of the screen output (No in step 805), the process proceeds to step 809 and an output form is set to "No" and the process ends. In a case in which the subsequent discomfort level is equal to or greater than the threshold of the screen output, the process proceeds to step 808, the output form is set "only display", and the process ends.

The process returns to step 801. In a case in which the discomfort level is equal to or greater than the threshold of the audio output, the process proceeds to step 802 to confirm whether the audio notification setting 404 related to the control event is "non-notification" with reference to the control event notification pattern data group 222. In a case in which the audio notification setting is "non-notification" (Yes in step 802), setting is meant to be performed such that the user does not perform the audio notification. Therefore, the output form is set to "only display" (step 808) and the process ends. In a case in which the audio notification setting is not "non-notification" (No in step 802), it is similarly confirmed whether the audio notification setting 404 is "notification". When the audio notification setting is "notification" (Yes in step 803), the output format is set to "audio+display" (step 804) and the process ends. When the audio notification setting is not "notification" (No in step 803), it is confirmed whether the number of notifications 405 related to the control event exceeds a predetermined threshold N with reference to the control event notification pattern data group 222 (step 806). When the number of notifications exceeds the predetermined threshold N, the output format is set to "only display" (step 808) and the process ends. Conversely, when the number of notifications 405 does not exceed the predetermined threshold N, 1 is added to the number of notifications 405 (step 807), the output format is set to "audio+display" (step 804), and the process ends.

In the embodiment, the audio output and the screen output of the control event information is determined according to the discomfort level. In particular, the audio output is not performed when the discomfort level is not high (in this example, when the discomfort level is not the highest level of 3). This is because when the audio output is performed, explicit notification is given to the user and therefore is a reason why the user may feel annoyed depending on the necessity to the user. Therefore, by displaying the control event information of which the discomfort level is low only on the screen without using the audio or outputting nothing, it is possible to reduce the annoyance felt by the user. The discomfort level 405 of the control discomfort pattern data group 124 may be configured to be changed via the screen input and output unit 240 of the on-vehicle display device 20. In such a configuration, it is possible to realize a customization operation of lowering the discomfort level 405 corresponding to a pattern which is habituated by the occupant or is not considerably felt as discomfort according to a difference in a sense.

The necessity and the non-necessity of the audio output is determined according to the number of notifications of the control event in step 806. This is because the annoyance felt by the user is reduced by repeating the same notification. When the user receives the same notification several times, the user learns the notification. However, when the audio notification is performed every time, the user may feel annoyed. Accordingly, by suppressing the audio notification when the number of notifications exceeds a predetermined number, it is possible to reduce the annoyance felt by the user. In the embodiment, the scheme of suppressing the excessive audio notification using the index such as the number of notifications has been described. An index such as a notification frequency may be used considering a time axis (for example, when the notification frequency exceeds a predetermined threshold, the audio notification is not performed). As indicated by "notification" and "non-notification" of the audio notification setting 404 of the control event notification pattern data group 222, the on-vehicle display device 20 according to the embodiment also has a function of causing the user to perform setting via the screen input and output unit 240 or the audio input and output unit 250. The user may be explicitly allowed to perform setting through a setting screen of the on-vehicle display device 20 or the user may be allowed to confirm and designate necessity and non-necessity of the audio output via the screen input and output unit 240 or the audio input and output unit 250 in a stage at which the number of notifications of the control event exceeds a predetermined value in step 807. It may be configured that the user can suppress the audio notification.

The process returns to the flow 650 of the traveling control information output process of FIG. 8. When the HMI output content decision process of step 662 is completed, the HMI output control process is performed according to the decided output format (step 663). For example, when the output form of "audio+display" is selected in step 662, the control event information is displayed with the screen input and output unit 240 and the audio notification is performed with the audio input and output unit 250. When "only display" is selected as the output format, the control event information is displayed with the screen input and output unit 240 and the audio output is not performed. When the output format is "no", the process ends without performing anything. A specific method of presenting the control event information will be described using a specific example. When the HMI output process is completed, the flow of the traveling control information output process in the on-vehicle display device 20 ends.

An operation of the traveling control system 1 in a specific scene will be described. FIG. 13 illustrates a scene (a signal intersection scene 900) in which a vehicle 901 is going straight on a road 931 (speed limit 40 km/h) toward a signal intersection 930. In front of the vehicle 901 which is traveling at 40 km/h, another vehicle 902 is traveling at 40 km/h. The color of a signal 912 at the intersection 930 on a traveling route of the vehicle 901 is "blue" and the vehicles can pass in this situation. On the other hand, the signal 912 is changed to red after 5 seconds in this situation (913). While the vehicle 901 is distant from the intersection 930 and may not pass through the intersection 930 before the signal 912 is changed to red, the vehicle 902 is assumed to be sufficiently close to the intersection 930 and therefore can pass. A roadside device 911 for road-vehicle communication is installed beside the signal intersection 930. The roadside device 911 is connected with the signal 912 via a predetermined network. The roadside device 911 acquires signal information regarding a color state or switch of the signal subsequent to the color state from the signal 912 and delivers the signal information to the vehicle 901 or the like through the road-vehicle communication according to a predetermined message format.

When a person drives the vehicle 901 in such a scene, the vehicle is assumed to be going toward the intersection 930 without deceleration in some cases while being accelerated while the signal is blue. Then, at a time point at which the signal 912 is changed to yellow, the person presses down on the brake to decelerate suddenly. This is because the person does not recognize how the signal 912 is changed in the future and controls the traveling of the vehicle 2 based on the color state of the signal 912 at that time point.

On the other hand, the traveling control system 1 can acquire information regarding the switch of the signal 912 from the roadside device 911, and thus can know that the signal 912 is changed to red after 5 seconds. Therefore, it is possible to prevent fuel from being wasted due to the sudden deceleration at the time of the deceleration of the vehicle 901 from the blue state of the signal 912 or unnecessary acceleration. However, since information recognized by a driver or an occupant of the vehicle 901 is a blue signal, it is not natural to decelerate the vehicle 901 and there is a possibility of discomfort being felt. Accordingly, in the embodiment, by notifying the driver or the occupant of a deceleration cause through the on-vehicle display device 20, it is possible to achieve a reduction in the discomfort.

The flow of a series of processes will be described with reference to the flow of the process of FIG. 5. In the signal intersection scene 900, first, the externality recognition information acquired in step 453 includes information regarding the other vehicle 902 and the signal 912. The information regarding the other vehicle 902 is a recognition result of the externality sensor group 50 such as a stereo camera, information acquired through inter-vehicle communication by the wireless communication unit 30, or an integrated result of the recognition result and the information. The information regarding the signal 912 is acquired through road-vehicle communication from the roadside device 911 by the wireless communication unit 30.

Next, driving behavior content is decided in step 454. In the signal intersection scene 900, the vehicle 900 is assumed to go straight through the intersection 930 without stop. Therefore, since the driving behavior mode corresponds to the normal traveling mode 301 and is not appropriate for the conditions of steps 551 to 557 according to the flow of the process of FIG. 6, the normal traveling mode remains and is not particularly changed (step 580).

Subsequently, the process proceeds to the traveling control content decision process (step 455). Since the process is equivalent to the traveling control content decision process in the normal traveling mode 301, the flow of the process of FIG. 7 is realized. The speed limit (40 km/h), the preceding vehicle 902, and the signal 912 of the traveling road are considered when an target vehicle speed is calculated in step 603. When an optimum vehicle speed is calculated, the vehicle is traveling at 40 km/h which is the upper limit of the speed limit and at 40 km/h with respect to the preceding vehicle 902. Therefore, the optimum vehicle speed is before and after 40 km/h (changed according to an inter-vehicle distance). On the other hand, since the signal 912 is changed to red after 5 seconds, a result in which the vehicle may not pass through the intersection 930 due to a relation of a distance up to the intersection is derived. Therefore, the traveling control decision unit 106 of the on-vehicle control device 10 performs control such that the vehicle stops at the intersection 930, and thus the optimum vehicle speed is a value considerably less than 40 km/h (for example, 20 km/h). In a case in which the target vehicle speed is calculated by integrating such calculation results, the lowest value is a final value. Therefore, the target vehicle speed is equal to 20 km/h. When α in step 604 is set to 5 km/h, the result "deceleration traveling" is obtained as the traveling control state (step 606). When the deceleration traveling is assumed not to be performed so far in step 609, the process proceeds to step 610. Then, "signal" is derived as a change cause of the traveling control state and the signal 912 (ID=912) is derived as a target object.

Referring back to FIG. 5, after the target control value is output to the actuator group 70 in step 456, the process proceeds to the flow 650 of the traveling control information output process of FIG. 8. The result of step 651 is Yes since the traveling control state is changed to "deceleration traveling". Thus, the discomfort determination process (step 652) is performed. In the flow 700 of the discomfort determination process of FIG. 10, the ninth entry is relevant in step 702 with reference to the control discomfort pattern data group 124 of FIG. 3. Therefore, the discomfort level is set to 3. Next, when the threshold=2 in step 653, the discomfort level (=3) of the control event the≥threshold (=2). Then, the process proceeds to step 654 and the control event message 670 is output.

Data included in the control event message 670 to be output will be described. "Traveling control change" is set in the type of control event 751, "normal traveling" is set in the type of driving behavior 752, "deceleration traveling" is set in the type of traveling control 753, "signal" is set in the control event cause 754, and "3" is set in the discomfort level 756. In regard to the control event cause target object information 755, "912" is stored in an ID 761, "signal" is stored in a type 762, information (for example, a node ID) indicating the intersection 930 in relation to the signal 912 is stored in positional information 763, and detailed information of the signal 912 is stored in attribute information 764. The attribute information 764 of the signal 912 includes, for example, information such as a kind (in this scene, a vehicle signal), a state (in this scene, blue), and a switch timing (in this scene, yellow after 3 seconds and red after 5 seconds) of the signal 912.

Referring back to FIG. 8, the on-vehicle display device 20 acquires the control event message 670 output by the on-vehicle control device 10 in step 661 and performs the HMI output content decision process 662 of FIG. 12. In the flow 800 of the process of FIG. 12, the discomfort level of the control event is 3. Therefore, the process first proceeds from step 801 to step 802. Referring to the control event notification pattern data group 222 of FIG. 4 in step 802, the correspondent control event is present at the sixth row and the audio notification setting 404 is "notification". Therefore, when the process reaches step 804 via step 803, "audio+display" is decided as the output format. Based on such decision result, the control event information is output to the screen input and output unit 240 and the audio input and output unit 250 in the HMI output control process 663.

An example of screen display of the on-vehicle display device 20 in the signal intersection scene 900 is illustrated in FIG. 14. In the embodiment, the screen input and output unit 240 includes a driving behavior mode display portion 1001, a control event notification display portion 1002, a navigation information display portion 1003, and a traveling track information display portion 1004.

The driving behavior mode display portion 1001 is a display portion indicating the driving behavior mode at the current time point. Since the driving behavior mode of the signal intersection scene 900 is the normal driving mode, "normal driving mode" is stated. A display method is not limited as long as the display method is expressed so that the driving behavior content can be known. For example, the display method may be expressed with an icon schematically representing the driving behavior mode.

The control event notification display portion 1002 is a display portion notifying of content and a cause of the control event. For example, text with a format such as "<control event content> is performed because <control event cause>" is displayed. In the control event at the signal intersection scene 900, "Deceleration is performed because passing of signal ahead is not possible" is stated because of the deceleration traveling control in which the signal is a cause. In this example, apart corresponding to <control event cause> is not simply "signal", but is replaced with words "passing of signal ahead is not possible". This intends to report the part to the user so that the user can more easily understand and can be achieved specifically by retaining patterns of words corresponding to the control event causes in the on-vehicle display device 20 and converting the patterns when the patterns are displayed in the control event notification display portion 1002. A method of expressing the control event notification display portion 1002 is not particularly limited as long as the content and the cause of the control event are expressed, and an icon representing the content and the cause of the control event may be expressed. This display portion is assumed to be presented to the user when a control event is generated. Therefore, the display may be deleted when a given time passes after the display, the display may be continued until the traveling control state is subsequently changed, or the display may be deleted through a panel operation or the like by the driver.

The navigation information display portion 1003 is a display portion in which a surrounding road map of the self-vehicle 901 is displayed and a position (1011) and a traveling route (1016) of the vehicle 2 on the map are indicated. The navigation information display portion 1003 corresponds to a display screen of a general navigation system. In the embodiment, when the traveling route on the road map is displayed and a control event is generated, a target object which is a cause of the control event is emphasized and displayed at the correspondent position on the map. Since the cause of the control event in the signal intersection scene 900 is the signal 912 of the intersection 930 in FIG. 13, the state (blue) of the signal 912 is emphasized and displayed at the position of an intersection 1014 corresponding to the intersection 930 in the map of the navigation information display portion 1003 (1012 of FIG. 14). By emphasizing and displaying a target object of the cause at the correspondent position on the map, the user can easily recognize the position of the signal in the real world from a relative relation with respect to the self-vehicle position 1011. When the signal is displayed as a blue signal which is the state at that time point on purpose rather than the red signal which is a cause of the deceleration traveling herein, the user can easily recognize the cause target object in the real world. On the other hand, the cause of the deceleration traveling is the switch to the red signal before the passing of the intersection 1014 (the intersection 930 of FIG. 13). In order for the user to recognize the switch, a switch timing of the signal to the red signal is presented as attribute information of the signal 1012 in a form 1015. When the switch timing of the signal to the red signal is indicated, the user can instantly recognize that the vehicle may not pass through the intersection 1014 from a distance relation with the intersection 1014. When the position of the target object of the cause is emphasized and displayed on the map in the form which can be recognized in the field of view by the user and the attribute information suggesting the cause of the control event is individually presented as necessary, the user can easily recognize the target object in the real world and can easily comprehend the cause of the control event.

The traveling track information display portion 1004 is a display portion indicating the externality recognition information of the neighbor of the self-vehicle and indicating a latest traveling track of the self-vehicle. A vehicle 1021 represents the self-vehicle 901 and a vehicle 1022 indicates the other vehicle 902 recognized by the externality sensor group 50 the wireless communication unit 30, or the like. An arrow 1023 represents a traveling track of the vehicle 1021. Since the self-vehicle 901 travels straight in the signal intersection scene 900, the traveling track has a form along lanes.

Through the above-described series of processes, it is possible to reduce the discomfort felt by the user by the deceleration control in such a manner that by the traveling control system 1 notifies the user of the deceleration because of the cause in which the vehicle may not pass through the signal of the intersection ahead at the time of the deceleration control in the signal intersection scene 900.

Next, an operation of the traveling control system 1 in another specific scene will be described. FIG. 15 illustrates a scene (lane change scene 1110) in which a vehicle 1101 attempts to change the lane to avoid a preceding low-speed vehicle 1102 (30 km/h) in a straight road 1110 (speed limit 60 km/h). Other vehicles 1103 and 1104 are traveling in an overtake lane, and thus the vehicle may not overtake at this time point in this situation.

In such a scene, a flow is realized in such a manner that in a case in which a person is driving the vehicle 1101, the person who has an intention of overtaking the preceding low-speed vehicle waits until the lane can be changed to the overtake lane and determines to be able to change the lane, the person changes the lane at a time point at which the other vehicle 1103 and the like have passed.

Conversely, in the case of the automatic driving system, an intention as for the driving is invisible from the viewpoint of the person. For this reason, while the person is conscious of overtaking a preceding low-speed vehicle at a time point at which the person detects the presence of the preceding low-speed vehicle, the person may not recognize that the automatic driving system has an intention of overtaking a preceding low-speed vehicle until the automatic driving system actually performs lane change control. That is, there is a possibility of a driver or an occupant feeling discomfort since the driver or the occupant may not recognize that the automatic driving system takes an expected driving action. Accordingly, in the embodiment, by notifying a driver or an occupant of an intention of changing a lane in the traveling control system 1 through the on-vehicle display device 20, it is possible to achieve a reduction in discomfort.

The flow of a series of processes will be described with reference to the flow of the process of FIG. 5. In a lane change scene 1100, first, the externality recognition information acquired in step 453 includes information regarding other vehicles 1102 to 1104. The information regarding the other vehicles 1102 to 1104 is a recognition result of the externality sensor group 50 such as a stereo camera, information acquired through inter-vehicle communication by the wireless communication unit 30, or an integrated result of the recognition result and the information.

Next, driving behavior content is decided in step 454. The driving behavior mode at this time point is assumed to be the normal traveling mode in which the vehicle travels on the same lane. According to the flow of the process of FIG. 6, the driving behavior mode is appropriate for the condition of step 557, the process proceeds to step 567, the driving behavior mode is changed to "lane change", and the exercise behavior decision cause is set to "preceding low-speed vehicle". In subsequent step 571, information regarding the other vehicle 1102 is extracted as target object information.

Subsequently, the process proceeds to the traveling control content decision process (step 455). Since the driving behavior mode is changed to "lane change" in step 454, the traveling control content decision process in the lane change mode is performed. As the types of traveling control in the lane change mode 304, as illustrated in FIG. 2, the lane keeping traveling control 340 and the lane change traveling control 341 are defined. Although the flow of the process is not described, a flow is realized in such a manner that according to the lane keeping traveling control 340 in which the vehicle travels on a current lane without change until safety of entrance into a change destination lane is confirmed, the traveling control state transitions to the lane change traveling control at a time point at which the safety is confirmed to control the actual lane change. In the lane change scene 1100, since entrance into an overtake lane is dangerous due to presence of the other vehicle 1103, a target track is calculated according to the lane keeping traveling control 340 and control target values of a steering angle and a vehicle speed are calculated. The travel control state in the lane change mode is changed due to determination of whether to enter the change destination lane, and it is obvious from the viewpoint of the driver or the occupant that the driver or the occupant recognizes the lane change intention by the traveling control system 1. Therefore, since the discomfort is not felt, a traveling control state change cause or its target object may not be specified as in the normal traveling mode. This can be applied similarly to the right turn mode 302, the left turn mode 303, the parking mode 305, and the like.

Referring back to FIG. 5, after the target control value is output to the actuator group 70 in step 456, the process proceeds to the flow 650 of the traveling control information output process of FIG. 8. The result of step 651 is Yes since the driving behavior mode is changed from "normal traveling mode" to "lane change mode". Thus, the discomfort determination process (step 652) is performed. In the flow 700 of the discomfort determination process of FIG. 10, the sixth entry is relevant in step 702 with reference to the control discomfort pattern data group 124 of FIG. 3. Therefore, the discomfort level is set to 3. Next, when the threshold=2 in step 653, the discomfort level (=3) of the control event the threshold (=2). Then, the process proceeds to step 654 and the control event message 670 is output.

Data included in the control event message 670 to be output will be described. "Driving behavior change" is set in the type of control event 751, "lane change" is set in the type of driving behavior 752, "lane keeping traveling" is set in the type of traveling control 753, "low-speed vehicle" is set in the control event cause 754, and "3" is set in the discomfort level 756. In regard to the control event cause target object information 755, "1102" is stored in an ID 761, "another vehicle" is stored in a type 762, positional information (for example, latitude and longitude) of the other vehicle 1102 is stored in positional information 763, and detailed information of the other vehicle 1102 is stored in attribute information 764. The attribute information 764 of the other vehicle 1102 includes, for example, information such as a traveling speed of the other vehicle 1102.

Referring back to FIG. 8, the on-vehicle display device 20 acquires the control event message 670 output by the on-vehicle control device 10 in step 661 and performs the HMI output content decision process 662 of FIG. 12. As in the signal intersection scene 900, "audio+display" is decided as the output form since the discomfort level is 3. Based on such decision result, the control event information is output to the screen input and output unit 240 and the audio input and output unit 250 in the HMI output control process 663.

An example of screen display of the on-vehicle display device 20 in the lane change scene 1100 is illustrated in FIG. 16.

The configuration of the screen input and output unit 240 is the same as the signal intersection scene 900, and thus includes a driving behavior mode display portion 1151, a control event notification display portion 1152, a navigation information display portion 1153, and a traveling track information display portion 1154.

Since the driving behavior mode in the control event of the lane change scene 1100 is the lane change mode, "lane change mode" is stated in the driving behavior mode display portion 1151. Since <control event cause> is "low-speed vehicle" and <control event content> is a lane change, "Lane change is being examined to avoid preceding low-speed vehicle" is expressed in the control event notification display portion 1152. The reason why "Lane change is being examined" is stated instead of "Lane is changed" is that the traveling control state is "lane keeping traveling" and that the lane change is not yet controlled. Since the control event depends on a change in the driving behavior content, a purpose is for the traveling control system 1 to notify of an intention of an idea of performing certain driving rather than to notify of the traveling control content. In a case in which the traveling control state of the lane change mode transitions to "lane change traveling", the control event notification display portion 1152 expresses, for example, a subject in the notification of the traveling control content, like "Lane is changed to avoid preceding low-speed vehicle". As in the display example of the control event notification display portion 1152 in FIG. 16, the mode of the driving behavior is changed. However, in a case in which the driving control to be specifically performed is being examined (calculated), any of various display forms such as flashing of display of the display portion can be adopted.

In the traveling track information display portion 1154, as in the case of the signal intersection scene 900, the latest traveling track of the self-vehicle is indicated along with the externality recognition information of the neighbor of the self-vehicle. A vehicle 1171 indicates a self-vehicle 1101, and vehicles 1172 to 1174 indicate other vehicles 1102 to 1104 recognized by the externality sensor group 50, the wireless communication unit 30, or the like.

First, a characteristic point is that the vehicle 1172 corresponding to the low-speed vehicle 1102 which is a case of the control event is surrounded by a dotted line 1182 to be emphasized and displayed. In the signal intersection scene 900, the control event cause is emphasized and displayed on the navigation information display portion. However, since it is necessary to display a positional relation at granularity of a lane level in order to cause the user to easily recognize the low-speed vehicle 1102 in the real world, it is desirable to emphasize and display the vehicle in the traveling track information display portion 1154. The vehicle may be emphasized and displayed in both of the navigation information display portion 1153 and the traveling track information display portion 1154. The emphasis and display method illustrated in FIG. 16 is merely an example and any emphasis and display method may be used. For example, the color of the correspondent vehicle may be changed, may blink, or may be expanded and displayed.

Another characteristics point is that a traveling track 1180 of the vehicle 1171 is indicated and a traveling track 1181 of the lane change during examination is displayed with a dotted line. This visually conveys the fact that the traveling control system 1 has an intention of changing the lane and has a meaning of a lane change destination intended in a situation in which the lane change on both sides is possible. The reason why the dotted line is displayed is that the lane change is in the examination stage at this time point and the actual traveling control is not yet performed. In a case in which the traveling control state of the lane change mode transitions to "lane change traveling", the current traveling track 1180 disappears and a traveling track 1181 of the lane change is displayed with a solid line.

Through the above-described series of processes, it is possible to give comfort to the user expecting avoidance of a low-speed vehicle in such a manner that by the traveling control system 1 notifies the user of the intention of the lane change along with the cause (the low-speed vehicle) at the time point at which the intention of the lane change is accompanied even before the transition to the control of the actual lane change in the lane change scene 1100.

According to the embodiment, as described above, the on-vehicle control device 10 of the vehicle 2 specifies the decision cause and the target object at the time of the change of the driving behavior content and outputs information regarding the decision cause and the target object to the outside. Then, based on the output information, the on-vehicle display device 20 presents the driving behavior content of the traveling control system 1 along with the cause to the user. Thus, the user can comprehend the idea in which the traveling control system 1 performs driving because of a certain reason or comprehend the driving, and thus it is possible to reduce the discomfort further felt by the user since the user may not expect the operation of the vehicle 2 by the automatic driving.

According to the embodiment, the on-vehicle control device 10 of the vehicle 2 specifies the decision cause and the target object at the time of the change of the traveling control content and outputs information regarding the decision cause and the target object to the outside. Then, based on the output information, the on-vehicle display device 20 presents the driving behavior content of the traveling control system 1 along with the cause to the user. Thus, the user can comprehend the idea in which the traveling control system 1 performs certain control because of a certain reason or comprehend the performed control, and thus it is possible to reduce the discomfort further felt by the user since the user may not instantly recognize the reason of the traveling control.

According to the embodiment, the on-vehicle control device 10 of the vehicle 2 evaluates whether the user feels the discomfort due to a change in the driving behavior content or the traveling control content and a combination of the causes and determines whether to output the evaluation to the outside according to the degree of discomfort. Thus, by excluding information which is information worthless to be notified, it is possible to reduce the annoyance felt by the user due to excessive notification. Similarly, the on-vehicle display device 20 of the vehicle 2 determines whether to give notification only on the screen display or whether to give notification along with audio according to the degree of discomfort. This also means that an evoking level for the user is adjusted according to importance of information, and thus the advantageous effect of reducing the annoyance felt by the user due to excessive notification can be obtained.

Second Embodiment

In the first embodiment, the on-vehicle control device 10 retains the control discomfort pattern data group 124 indicating the combination pattern of the control event and the cause which is likely to give discomfort in order to determine the level of the discomfort felt with respect to the change in the driving behavior or the traveling control. In a second embodiment, an example in which control discomfort is determined in accordance with another scheme will be described.

FIG. 17 illustrates a flow 1200 of the discomfort determination process. This corresponds to the discomfort determination process of step 652 of FIG. 8 in the second embodiment.

The on-vehicle control device 10 acquires control event information (step 1201) and subsequently confirms whether the control event is generated due to a change in a driving behavior (step 1202). In a case in which the control event is generated due to the change in the driving behavior, the discomfort level is set to 3 (the maximum value) (step 1206) and the process ends. This means that the control event in regard to the change in the driving behavior is necessarily output to the outside.

Conversely, in a case in which the control event is not generated due to the change in the driving behavior, that is, the control event is generated due to a change in the traveling control (No in step 1202), an information source of a cause target object is first specified from the control event information acquired in step 1201 (step 1203). Here, the information source means that the cause target object is recognized by certain means and corresponds to, for example, a camera or a radar included in the externality sensor group 50, wireless communication by the wireless communication unit 30, or the like. Even in a case in which there are a plurality of information sources of the cause target object, an information source from which information used at the time of decision of the control event may not be acquired is excluded. For example, in the signal intersection scene 900 according to the first embodiment, a signal state can be recognized by a camera in addition to the wireless communication, but information used to decide the control event is information regarding a switch timing of a signal and this information may not be recognized from the camera. In this case, only the wireless communication corresponds to the information source.

A person recognizes a situation out of a vehicle by actually seeing with his or her eyes and determines a driving behavior of the vehicle based on the recognition. On the other hand, the traveling control system 1 may acquire even information which may not recognized by a person. In a case in which driving behavior content or traveling control content is decided based on information which can be recognized by a person, the person less feels discomfort due to the content. However, driving behavior content or traveling control content based on information which may not be recognized by a person is highly likely to give discomfort. Accordingly, whether information can be recognized by a user is determined according to the type of information source of the cause target object and other distinctive conditions, and a discomfort level is specified. Specifically, instead of the control discomfort pattern data group 124 according to the first embodiment in step 1204, a discomfort level is specified with reference to a control discomfort pattern data group 1300 illustrated in FIG. 18.

The control discomfort pattern data group 1300 is a collective of data indicating the degree of discomfort felt in regard to an information source of a cause target object and a distinctive condition. The type of information source 1301 represents recognition means for a cause target object. The distinctive condition 1302 represents an environment condition in which a discomfort level 1303 is changed in the type of information source 1301. The discomfort level 1303 represents the degree of discomfort which is likely to be felt at the time of a combination of the correspondent type of information source 1301 and distinctive condition 1302. For example, since a visible light camera is substantially the same as human recognition means for a situation out of the vehicle, its discomfort level is set to 0. For example, a millimeter wave radar has a feature in which a distant obstacle can be detected. Since a distant target object may not be recognized with human eyes, the discomfort level is set to be changed according to a distance from the target object. For example, an infrared camera has a feature in which an obstacle can be detected even at night. However, since a target object may not be recognized at a dark place with human eyes, the discomfort level is set to be changed between night and other times. Alternatively, means (for example, a luminance sensor) for recognizing brightness out of a vehicle may be provided to change the discomfort level according to the level of the brightness. FIG. 18 is merely an example and any condition such as a relative distance, brightness out of a vehicle, weather, or inferiority of a vision field may be set in any type of information source. The type of information source may be distinguished according to a method of installing an externality sensor in a vehicle to adjust the discomfort level. For example, a front camera and a rear camera may be set as different types of information sources.

The cause target object is recognized by a plurality of information sources in some cases. In this case, in step 1203, a correspondent discomfort level is specified with reference to the control discomfort pattern data group 1300 in regard to each information source. For example, in a case in which a preceding vehicle which is 100 meters ahead is assumed to be a cause target object and the preceding vehicle is detected with a visible light camera and a millimeter wave radar, the discomfort level of the visible light camera is specified as 0 (in the first row) and the discomfort level of the millimeter wave radar is specified as 2 (in the third row).

Then, in subsequent step 1205, a minimum value is selected from one or more of the specified discomfort levels, the minimum value is set as the discomfort level of the control event, and the present process ends.

As described above, according to the embodiment, the on-vehicle control device 10 of the vehicle 2 evaluates whether the discomfort is felt by the user according to the means by which a target object which is a decision cause of the traveling control content is recognized and determines whether to output the evaluation to the outside according to the degree of discomfort. Thus, by focusing on the control content performed based on information which may not be recognized by a person and notifying of the control content, it is possible to reduce the annoyance felt by the user due to excessive notification.

Third Embodiment

In the first and second embodiments, the example of the schemes of notifying the content and cause of the driving behavior or the traveling control using the change in the driving behavior or the traveling control as a trigger. On the other hand, even in a case in which a change in the driving behavior or the traveling control is not accompanied, a user feels discomfort in some cases. In the embodiment, an example of means for detecting a situation which is likely to give discomfort to a user and notifying the user of the situation irrespective of whether the driving behavior or the traveling control is changed will be described.

In the embodiment, in a traveling control content decision process, a process of confirming whether the user feels discomfort is performed on a calculation result when a target steering angle and a target vehicle speed is calculated (corresponding to steps 602 and 603 of FIG. 7).

An example of a target vehicle speed calculation process will be described. As described in the first embodiment, the target vehicle speed is calculated by evaluating vehicle speeds appropriate for obstacles (for example, other vehicles, pedestrians, or fallen objects) in the traveling route or the target track, road shapes (for example, curves, intersections, junctions, divisions, or a reduction in road widths), and traffic regulations (for example, a signal or a speed limit) and integrating the vehicle speeds. In the embodiment, two kinds of target vehicle speeds, an optimum target vehicle speed calculated using all of the externality recognition information as in the first embodiment and a target vehicle speed calculated by excluding the externality recognition information which may not be recognized by the user, are calculated. Then, the two kinds of calculated target vehicle speeds are compared to each other. In a case in which there is a meaningful difference, it is determined that there is a high possibility of discomfort felt by the user. This is because the difference between the calculation results of the two kinds of target vehicle speeds means that control content (corresponding to the former target vehicle speed) of the traveling control system 1 is different from a case (the latter target vehicle speed) in which the user recognizes a situation out of the vehicle and drives. The externality recognition information which may not be recognized by the user is, for example, a switch timing of a signal which can be obtained only through wireless communication or a traffic situation (congestion of a curve destination or the like) of a blind area. The identification of the externality recognition information which may not be recognized by the user may be determined by retaining a list of the types of correspondent information (a switch timing of a signal and the like) in advance and combining the types of information or may be determined according to the types of information sources or the distinctive conditions as in the control discomfort pattern data group 1300 introduced in the second embodiment.

When it is determined that there is a high possibility of discomfort felt by the user due to the traveling control content, as described above, the traveling control state is output as control event information to the on-vehicle display device 20 although the traveling control state is not changed. When the on-vehicle display device 20 receives this information, the on-vehicle display device 20 notifies the user of the information by outputting the information through screen display or audio output as necessary according to the same scheme as that of the first embodiment.

Hereinafter, a specific scene will be described. FIG. 19 illustrates a scene (signal intersection scene 1400) in which the color of the signal 912 in the signal intersection scene 900 is switched from blue→red and red→blue. That is, the color of a signal 1412 is "red" at this time point and the vehicle may not pass in this situation. On the other hand, the signal 1412 is switched to blue after 5 seconds and the self-vehicle 901 is notified of its information via the road-side device 911 through road-vehicle communication. Since the signal 1412 is in a red situation, the speed of another vehicle 902 is set to 10 km/h and the speed of the self-vehicle 901 is set to 30 km/h in accordance with that situation.

In the signal intersection scene 1400, a speed limit (40 km/h) of a traveling road, the preceding vehicle 902, and the signal 1412 are considered when the target vehicle speed is calculated. When each optimum vehicle speed is calculated, the upper limit of the speed limit is 40 km/h. The preceding vehicle 902 is traveling at 10 km/h, but is assumed to be calculated approximately 30 km/h assuming that a distance between the vehicles is sufficient. The signal 1412 is red at this time point, but is changed to blue after 5 seconds. Therefore, when the vehicle is moving toward the intersection 930 at the current speed, the result in which the vehicle can pass without stop is derived, and thus the optimum vehicle speed is determined to be 30 km/h. When a target vehicle speed is calculated by integrating such calculation results, the lowest value is the final value. Therefore, the target vehicle speed=30 km/h. This is an optimum target vehicle speed. On the other hand, when the externality recognition information which may not be recognized by the user is considered to be excluded, the information regarding the switch timing of the signal is not usable. Therefore, for the signal 1412, for example, only information regarding the color of the signal recognized with a camera or the like is obtained. In this case, since the signal 1412 is a red signal, the vehicle is determined to stop before the intersection 930. Thus, the optimum vehicle speed is a value (for example, 15 km/h) considerably less than 30 km/h. Here, when the calculation results of two target vehicle speeds are compared to each other, it can be understood that there is a considerable difference. That is, the control content of the traveling control system 1 means that there is a high possibility of the discomfort felt by the user, unlike the case in which the user recognizes a situation out of the vehicle in the driving. The degree of felt discomfort is set according to, for example, the degree of difference between the two target vehicle speeds. In this example, the discomfort level is assumed to be set to "3".

Therefore, the on-vehicle control device 10 outputs relevant information to the on-vehicle display device 20. Specifically, for example, according to the control event message format 750, "traveling control change" (here, another type of control event may be defined since there is no actual change) is set in the type of control event 751, "normal traveling mode" is set in the type of driving behavior 752, "normal traveling" is set in the type of traveling control 753, "signal" is set in the control event cause 754, and "3" is set in the discomfort level 756. In regard to the control event cause target object 755, "1412" is stored in the ID 761, "signal" is stored in the type 762, information (for example, a node ID) indicating the intersection 930 in relation to the signal 1412 is stored in the positional information 763, and detailed information of the signal 1412 is stored in attribute information 764. The attribute information 764 of the signal 1412 includes, for example, information such as a kind (in this scene, a vehicle signal), a state (in this scene, red), and a switch timing (in this scene, blue after 5 seconds) of the signal 912.

An example of screen display of the on-vehicle display device 20 in the signal intersection scene 1400 is illustrated in FIG. 20. The screen configuration and the display content are substantially the same as those of the screen display example of the signal intersection scene 900 in FIG. 14. Considerably changed content is a control event notification display portion 1502, <control event cause> corresponds to "signal", and <control event content> corresponds to "normal traveling". Thus, "Normal traveling is performed because passing through signal ahead possible" is expressed.

As described above, according to the embodiment, when the target steering angle and the target vehicle speed are calculated, the on-vehicle control device 10 of the vehicle 2 determines whether the user feels discomfort in regard to the control content by comparing the calculation result obtained using all of the externality recognition information with the calculation result obtained using only the information predicted to be recognizable by the user. Since the discomfort is determined in every process loop in which the control content is decided, it is possible to obtain the advantageous effect in which the control state likely giving discomfort to the user can be detected irrespective of the change in the control content. Since the discomfort is determined based on the actual externality recognition information, it is possible to handle an influence caused due to an environment change such as blocking of a vision field due to an obstacle, weather, or the like.

The above-described embodiments are merely examples and the invention is not limited thereto. That is, various applications are possible and all of the embodiments are included in the scope of the invention.

For example, in the foregoing embodiments, each process of the on-vehicle control device and the on-vehicle display device is realized by executing a predetermined operation program using a processor and a RAM, but each process can also be realized with independent hardware as necessary. In the foregoing embodiments, the on-vehicle control device, the on-vehicle display device, the wireless communication unit, the self-vehicle positioning device, the externality sensor group, the vehicle sensor group, and the actuator group are described as separate devices, but any two or more of the devices may be combined to be realized as necessary.

When each of the foregoing processes is realized by executing a predetermined operation program by the processor, information regarding an operation program, a table, a file, and the like realizing each process can be stored in a non-volatile semiconductor memory, a storage device such as a hard disk drive or a solid state drive (SSD), or a computer-readable non-transitory data storage medium such as an IC card, an SD card, or a DVD.

In the drawings, the control lines and information lines considered to be necessary to describe the embodiments are illustrated, and all of the control lines and the information lines included in actual products to which the invention is applied may not be said to be necessarily illustrated. In practice, almost all configurations may be considered to be connected to each other.

REFERENCE SIGNS LIST 1 traveling control system
2 vehicle
10 on-vehicle control device
20 on-vehicle display device
30 wireless communication unit
40 self-vehicle positioning device
50 externality sensor group
60 vehicle sensor group
70 actuator group
100 CPU of on-vehicle control device 10
101 relevant information acquisition unit
102 externality recognition information integration unit
103 map position estimation unit
104 driving behavior decision unit
105 driving behavior cause specifying unit
106 traveling control decision unit
107 traveling control cause specifying unit
108 cause target object information extraction unit
109 control discomfort determination unit
110 traveling control information output unit
111 externality recognition information output unit 120 storage unit of on-vehicle control device 10
121 surrounding road map data group
122 self-vehicle information data group
123 externality recognition information data group
124 control discomfort pattern data group
130 communication unit of on-vehicle control device 10
200 CPU of on-vehicle display device 20
201 traveling route decision unit
202 surrounding map information transmission unit
203 traveling route information transmission unit
204 traveling control information acquisition unit
205 traveling control information output unit
206 externality recognition information acquisition unit
220 storage unit of on-vehicle display device 20
221 road map data group
222 control event notification pattern data group
223 external recognition information data group
230 communication unit of on-vehicle display device 20
240 screen input and output unit of on-vehicle display device 20
250 audio input and output unit of on-vehicle display device 20

The invention claimed is:

1. A system for automatic control of a vehicle, the system comprising:
a communication interface that is communicatively coupled to a plurality of sensors and actuators, wherein motion of the vehicle is controlled by the actuators;
a display; and
a processor communicatively coupled to the communication interface and the display, wherein the processor:
receives, using the communication interface, externality recognition information from the plurality of sensors, wherein the externality recognition information includes an obstacle and another vehicle on a route,
receives, using the communication interface, self-vehicle information from the plurality of sensors, wherein the self-vehicle information includes a position and a traveling speed of the vehicle,
determines, a driving behavior to be taken by the vehicle based on the externality recognition information and the self-vehicle information,
determines traveling control content based on the driving behavior,
determines whether the driving behavior is likely to cause discomfort to an occupant of the vehicle based upon control discomfort pattern information,
determines a cause of the driving behavior based on the externality recognition information and the self-vehicle information,
outputs, using the display, display information that includes the driving behavior and the cause of the driving behavior based on whether the driving behavior is likely to cause discomfort, and
controls, using the communication interface, the actuators based on the driving behavior and the traveling control content, wherein the display information is output on the display prior to controlling the actuators.

2. The system according to claim 1,
wherein the processor further extracts a cause target object from the external recognition information, and
wherein the display information further includes the cause target object.

3. The system according to claim 1,
wherein the display information further includes the traveling control content.

4. The system according to claim 1,
wherein in a case in which a change in the traveling control content is detected, the processor determines traveling control discomfort according to a type of sensor from the plurality of sensors that provided the externality recognition information.

5. The system according to claim 4,
wherein the processor determines the traveling control to minimize the traveling control discomfort.

6. The system according to claim 1, further comprising:
a memory that stores:
a discomfort index in which the discomfort felt by the occupant is indexed is retained in association with the combination of the traveling control content,
an output determination threshold which is a standard value regarding whether to output information based on the discomfort is set in the discomfort index, and
wherein the processor further outputs the display information when traveling control discomfort exceeds the threshold.

7. The system according to claim 1, further comprising: an audio output unit that outputs the display information through sound.

8. The system according to claim 1,
processor suppresses the output of the display information in a case in which a number of outputs of the display information exceeds a predetermined number.

9. A system for automatic control of a vehicle, the system comprising:
a communication interface that is communicatively coupled to a plurality of sensors and actuators, wherein motion of the vehicle is controlled by the actuators;
a display; and
a processor communicatively coupled to the communication interface and the display, wherein the processor:
receives, using the communication interface, externality recognition information from the plurality of sensors, wherein the externality recognition information includes objects outside a self-vehicle including an obstacle and another vehicle on a route,
receives, using the communication interface, a traveling speed limitation from a road side device,
receives, using the communication interface, self-vehicle information from the plurality of sensors, wherein the self-vehicle information includes a position and a traveling speed of the vehicle,
determines a driving behavior to be taken by the vehicle based on the externality recognition information and the traveling speed limitation,
determines traveling control content based on the driving behavior,
determines whether the driving behavior is likely to cause discomfort to an occupant of the vehicle based upon control discomfort pattern information,
determines a cause of the driving behavior based on the externality recognition information and the self-vehicle information,
outputs, using the display, display information that includes the driving behavior based on whether the driving behavior is likely to cause discomfort,
outputs, using an audio output of the display, the display information through sound, and
controls, using the communication interface, the actuators based on the driving behavior and the traveling control content, wherein the display information is output on the display prior to controlling the actuators.

\* \* \* \* \*